US012699158B2

(12) United States Patent
Arai

(10) Patent No.: US 12,699,158 B2
(45) Date of Patent: Aug. 4, 2026

(54) WAVE MOTION SIGNAL PROCESSING DEVICE, WAVE MOTION SIGNAL PROCESSING METHOD, AND RECORDING MEDIUM

(71) Applicant: NEC Corporation, Tokyo (JP)

(72) Inventor: Yumi Arai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 394 days.

(21) Appl. No.: 18/571,804

(22) PCT Filed: Jun. 23, 2021

(86) PCT No.: PCT/JP2021/023746
§ 371 (c)(1),
(2) Date: Dec. 19, 2023

(87) PCT Pub. No.: WO2022/269789
PCT Pub. Date: Dec. 29, 2022

(65) Prior Publication Data
US 2024/0361417 A1 Oct. 31, 2024

(51) Int. Cl.
*G01S 3/801* (2006.01)
*G01S 5/18* (2006.01)
*H04B 17/30* (2015.01)

(52) U.S. Cl.
CPC .................................... *G01S 3/801* (2013.01)

(58) Field of Classification Search
CPC ........ G01S 3/801; G01S 13/50; G01S 13/931; G01S 13/583; A61B 5/721; A61B 5/11; H04B 1/7077; G01R 31/001
See application file for complete search history.

(56) References Cited

U.S. PATENT DOCUMENTS

2011/0082690 A1    4/2011   Togami et al.
2014/0269843 A1*   9/2014   Schaffner ................. H04B 1/69
                                               375/139

(Continued)

FOREIGN PATENT DOCUMENTS

JP       2011-080868 A      4/2011
JP       2018-506078 A      3/2018
JP       2019-193049 A     10/2019

OTHER PUBLICATIONS

International Search Report for PCT Application No. PCT/JP2021/023746, mailed on Sep. 21, 2021.

(Continued)

*Primary Examiner* — Brandi N Hopkins
(74) *Attorney, Agent, or Firm* — Sughrue Mion, PLLC

(57) ABSTRACT

A wave motion signal processing device that includes a spectrum generation unit that generates a first spectrum with high resolution and a second spectrum with low resolution based on an input signal derived from a wave motion detected by at least one sensor, an extraction unit that extracts, from the second spectrum, a first peak satisfying an extraction condition in a target time window, a tracking unit that tracks, in the first spectrum, a second peak satisfying the extraction condition with regard to a time frame following the target time frame from which the first peak is extracted, and a waveform generation unit that generates a peak waveform, which is time-series data of a frequency including a plurality of second peaks, having the first peak as a starting end.

10 Claims, 17 Drawing Sheets

(56)  References Cited

U.S. PATENT DOCUMENTS

2016/0254007 A1      9/2016  Guo et al.
2018/0000423 A1*     1/2018  Kanishima ......... A61B 5/02416
2019/0326947 A1     10/2019  Kikuzuki
2021/0263126 A1*     8/2021  Arai ...................... H04R 3/005

OTHER PUBLICATIONS

English translation of Written opinion for PCT Application No. PCT/JP2021/023746, mailed on Sep. 21, 2021.

* cited by examiner

WAVE MOTION SIGNAL PROCESSING DEVICE, WAVE MOTION SIGNAL PROCESSING METHOD, AND RECORDING MEDIUM

This application is a National Stage Entry of PCT/JP2021/023746 filed on Jun. 23, 2021, the contents of all of which are incorporated herein by reference, in their entirety.

TECHNICAL FIELD

This disclosure relates to a wave motion signal processing device or the like for processing a signal originating from a wave motion.

BACKGROUND ART

By verifying a wave motion detected by a plurality of sensors, the direction of the wave source can be estimated. For example, by using a frequency change (also referred to as a peak waveform) due to the Doppler effect of a signal originating from the wave motion, the direction, position, and of velocity (also referred to as a trajectory) can be estimated. In signal analysis in estimation of the trajectory of the wave source, many frequency frames are analyzed to enhance resolution. The more the frequency frames, the greater the computational load for generating the peak waveform. Therefore, it is required to alleviate the computational load to analyze a signal originating from the wave motion.

PTL 1 discloses a spectrum analysis device for spectrum analysis of a wireless signal. The device of PTL 1 obtains a spectrum by performing the fast Fourier transform on a wireless signal with a resolution capable of visualizing characteristics of a Chirp Spread Spectrum (CSS) signal. The device of PTL 1 employs an effective value in a constant frequency domain to coarsen the frequency resolution of the spectrum to compute the duration of the wireless signal. The device of PTL 1 employs an effective value in the duration to coarsen the time resolution of the spectrum to compute the band width of the wireless signal. The device of PTL 1 determines characteristics of the wireless signal of each standard based on the computed duration and band width.

PTL 2 discloses a method for restoring utterance by an electronic device. The method of PTL 2 creates a noise suppression utterance signal having a band width including at least three sub bands by suppressing noise in the utterance signal. The method of PTL 2 repeatedly restores each of at least three sub bands. The method of PTL 2 determines the maximum value of utterance spectrum signal as a peak and tracks the peaks.

CITATION LIST

Patent Literature

PTL 1: Japanese Patent Application Laid-open No. 2019-193049
PTL 2: Japanese Patent Application Laid-open No. 2018-506078

SUMMARY OF INVENTION

Technical Problem

In the method of PTL 1 determines characteristics of the wireless signal of each standard based on the duration and band width determined by coarsening the frequency resolution and time resolution of the spectrum. The method of PTL 1 can detect a CSS signal in an environment in which wireless signals of a plurality of standards are mixed. However, the method of PTL 1 cannot be applied to tracking of a detected signal.

The method of PTL 2 restores each of the at least three sub bands based on a previously restored sub band. The method of PTL 2 can track a peak detected from an utterance spectrum signal with a large amount of data, but cannot track a peak based on a spectrum with a reduced amount of data. Therefore, the method of PTL 2 cannot sufficiently reduce the computational load for tracking a peak.

An object of the present disclosure is to provide a wave motion signal processing device or the like that may alleviate a load for processing a signal originating from a wave motion.

Solution to Problem

A wave motion signal processing device according to one aspect of this disclosure includes a spectrum generation unit that generates a first spectrum with high resolution and a second spectrum with low resolution based on an input signal derived from a wave motion detected by at least one sensor, an extraction unit that extracts, from the second spectrum, a first peak satisfying an extraction condition in a target time frame, a tracking unit that tracks, in the first spectrum, a second peak satisfying the extraction condition with regard to a time frame following the target time frame from which the first peak is extracted, and a waveform generation unit that generates a peak waveform, which is time-series data of a frequency including a plurality of second peaks, having the first peak as a starting end.

A wave motion signal processing method according to one aspect of this disclosure causes a computer to generate a first spectrum with high resolution and a second spectrum with low resolution based on an input signal originating from a wave motion detected by at least one sensor, extract, from the second spectrum, a first peak satisfying an extraction condition in a target time frame, track, in the first spectrum, a second peak satisfying the extraction condition with regard to a time frame following the target time frame from which the first peak was extracted, and generate a peak waveform, which is time-series data of a frequency including a plurality of second peaks, having the first peak as a starting end.

A program according to one aspect of this disclosure causes a computer to execute a process of generating a first spectrum with high resolution and a second spectrum with low resolution based on an input signal originating from a wave motion detected by at least one sensor, a process of extracting, from the second spectrum, a first peak satisfying an extraction condition in a target time frame, a process of tracking, in the first spectrum, a second peak satisfying the extraction condition with regard to a time frame following the target time frame from which the first peak was extracted, and a process of generating a peak waveform, which is time-series data of a frequency including a plurality of second peaks, having the first peak as a starting end.

Advantageous Effects of Invention

According to the present disclosure, a wave motion signal processing device or the like may be provided that may alleviate a load for processing a signal originating from a wave motion.

BRIEF DESCRIPTION OF DRAWINGS

FIG. 11 is a block diagram showing an example of a configuration of a wave motion signal processing device according to a second example embodiment.

FIG. 16 is a block diagram showing an example of a configuration of a wave motion signal processing device according to a third example embodiment.

FIG. 17 is a block diagram showing an example of a hardware configuration performing processing of each example embodiment.

EXAMPLE EMBODIMENT

Example embodiments will be described below with reference to the drawings. However, the example embodiments described below have technically preferable limitations for carrying out the present invention, but the scope of the present invention will not be limited to the following. In all drawings used in the following description of the example embodiments, like parts are provided with like reference symbols, unless otherwise noted. In the following example embodiments, repeated description of like configurations and operations may be omitted.

First Example Embodiment

First, a wave motion signal processing device according to a first example embodiment will be described with reference to the drawings. In the present example embodiment, a wave motion emitted from a wave source included in a mobile object is detected by a plurality of sensors. The wave motion signal processing device according to the present example embodiment generates a spectrogram with regard to the detected wave motion based on the wave motion detected by the plurality of sensors. The wave motion signal processing device according to the present example embodiment generates time-series data (also referred to as a peak waveform) of a frequency that enables the verification of the Doppler effect with the motion of the mobile object, with regard to the generated spectrogram. In the present example embodiment, it is assumed that the frequency band of the wave motion detected by the sensor is a band width in which the Doppler effect may be verified.

(Configuration)

Figure 1:
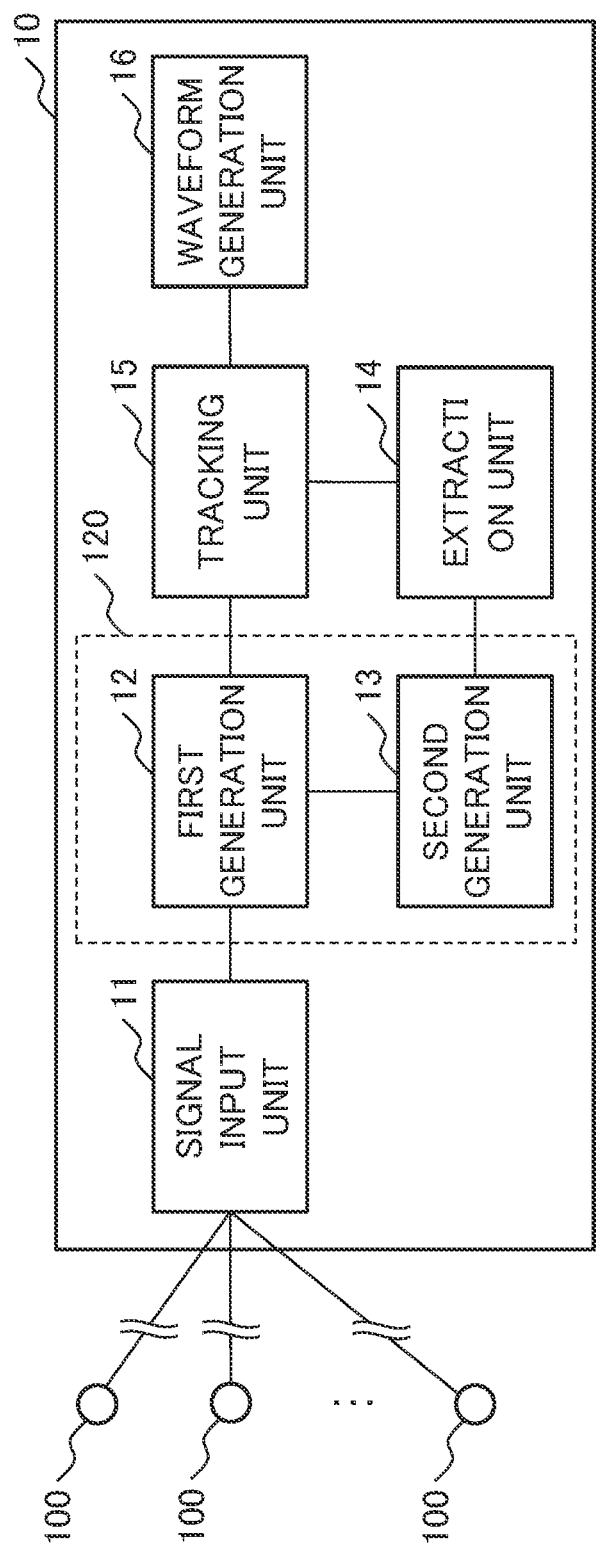
FIG. 1 is a block diagram showing an example of a configuration of a wave motion signal processing device according to a first example embodiment.

FIG. 1 is a block diagram showing an example of a configuration of the wave motion signal processing device 10 according to the present example embodiment. The wave motion signal processing device 10 includes a signal input unit 11, a first generation unit 12, a second generation unit 13, an extraction unit 14, a tracking unit 15, and a waveform generation unit 16. The first generation unit 12 and second generation unit 13 configure a spectrum generation unit 120. Hereinafter, the first generation unit 12 and second generation unit 13 will be described as different configurations, but the first generation unit 12 and second generation unit 13 may be integrally configured as the spectrum generation unit 120.

The wave motion signal processing device 10 is connected to a plurality of sensors 100 arranged at intervals. The sensor 100 senses a wave motion in which a wave motion emitted from a wave source included in the mobile object 110 and various wave motions generated around the wave source are mixed. The sensor 100 converts the sensed wave motion into a digital signal (also referred to as a sample value series). For example, when the wave source is a sound source, the sensor 100 may be achieved by a microphone. For example, when the wave source is a vibration source, the sensor 100 may be achieved by a vibration sensor. The sensor 100 is not limited to the microphone or vibration sensor, as long as it may detect a wave motion. A system including the wave motion signal processing device 10 and the plurality of sensors 100 is also referred to as a signal processing system.

The signal input unit 11 acquires a signal (also referred to as an input signal) originating from the wave motion detected by the plurality of sensors 100. The signal input unit 11 acquires an input signal in the time domain. For example, the signal input unit 11 performs signal processing such as filtering and noise removal on the input signal. The signal input unit 11 may be connected to the plurality of sensors 100 in a wired manner or in a wireless manner. For example, the signal input unit 11 may be connected to the plurality of sensors 100 via a not-shown network.

Figure 2:
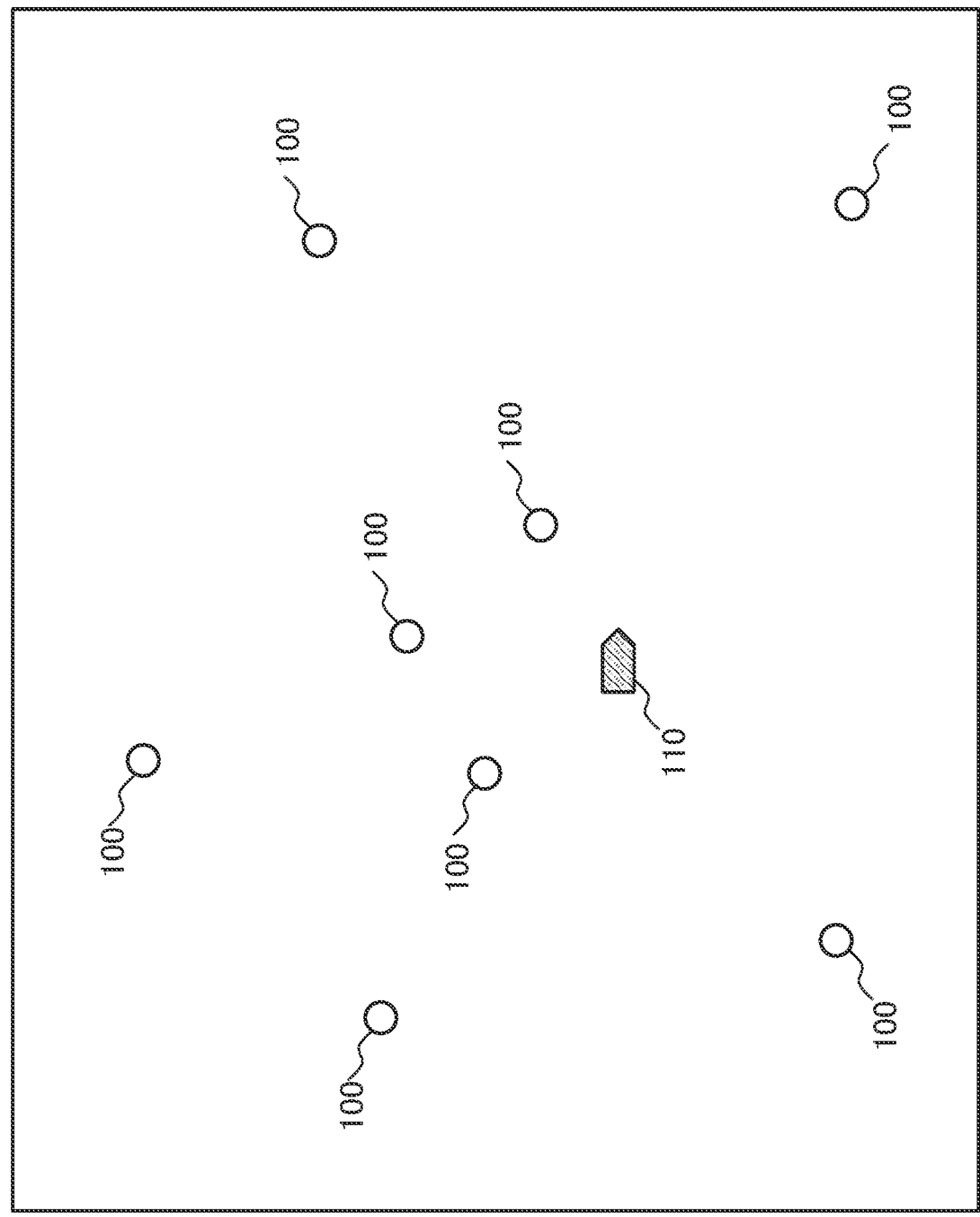
FIG. 2 is a schematic diagram for illustrating an arrangement example of a plurality of sensors that detect a wave motion that is the source of a signal input to the wave motion signal processing device according to the first example embodiment.

FIG. 2 is a schematic diagram showing an arrangement example of the plurality of sensors 100. The mobile object 110 having the wave source is located in a space in which the plurality of sensors 100 is arranged. The plurality of sensors 100 may be arranged in any manner. For example, the plurality of sensors 100 is arranged at intervals in accordance with the type of the mobile object 110. For example, the plurality of sensors 100 may be arranged at regular intervals or at any intervals. The plurality of sensors 100 may change in positional relationship with each other.

The first generation unit 12 computes a high resolution spectrum (referred to as a first spectrum) from the input signal. The first generation unit 12 generates a signal in the frequency domain (also referred to as a frequency spectrum) from an input signal in the time domain in units (also referred to as a time frame) conforming to a certain rule. For example, the length of the time frame is set to 2 n-th power sample (n is a natural number), such as 1024 samples and 4096 samples.

Figure 3:
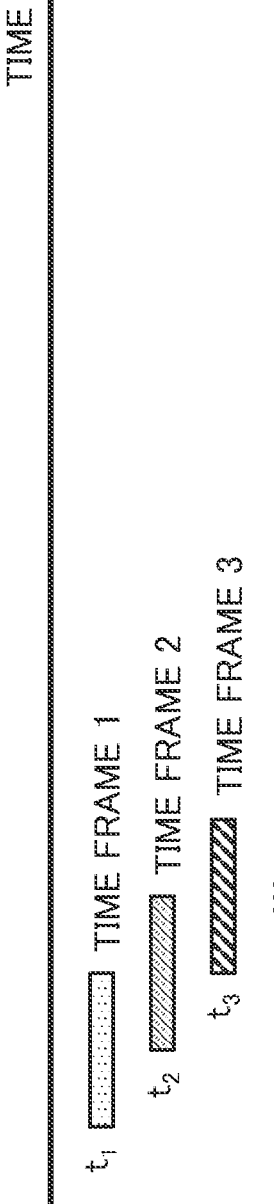
FIG. 3 is a schematic diagram for illustrating frames processed by the wave motion signal processing device according to the first example embodiment.

FIG. 3 is a schematic diagram in which the time frames generated by the first generation unit 12 are arrange along the time axis. FIG. 3 shows a plurality of frames associated with a specific time (time $t_1$, time $t_2$, time $t_3$, . . . ). In the example of FIG. 3, the plurality of time frames are set to overlap each other in time. The plurality of time frames may be set sequentially without overlapping in time. The plurality of time frames may be set at intervals in terms of time. A method for setting the time frame is not particularly limited.

The frequency spectrum is a frequency component in each time frame. For example, the first generation unit 12 generates a frequency spectrum by Fourier transform. For example, the first generation unit 12 may generate a frequency spectrum by Constant-Q Transform (CQT), wavelet transform, or the like.

Figure 4:
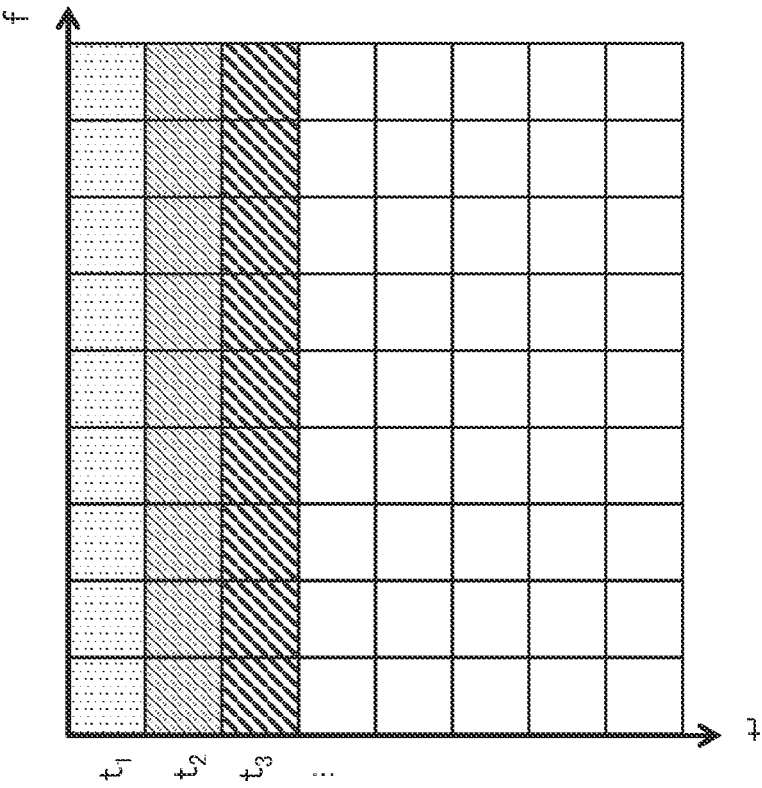
FIG. 4 is a schematic diagram for illustrating a first spectrum generated by a first generation unit of the wave motion signal processing device according to the first example embodiment.

FIG. 4 is a schematic diagram for illustrating the first spectrum generate by the first generation unit 12. The first spectrum of FIG. 4 is the frequency spectra computed from the respective time frames shown in FIG. 3 that are arranged in chronological order along the time axis (y-axis). In FIG. 4, the x-axis represents a frequency, and an example in which the number of frames (To distinguish from the time frame in FIG. 3, this is referred to as a "frequency frame") configuring each frequency spectrum is nine is illustrated, but the number of practical frequency frames is not reflected. In order to increase the frequency resolution, the number of samples in each frequency frame in FIG. 3 may be increased.

The second generation unit 13 coarsens the resolution of the first spectrum generated by the first generation unit 12 to generate a low resolution spectrum (also referred to as a second spectrum). The second generation unit 13 sets a cluster (also referred to as a bin) obtained by integrating a plurality of frames for each unit time and unit frequency based on the first spectrum. The bins adjacent to each other may share the frame of the boundary portion. In other words, the bins adjacent to each other may overlap. The second generation unit 13 calculates a representative value of the intensity and energy of the amplitude of the frame included in the bin, and generates the second spectrum based on the computed representative value. For example, the second generation unit computes the maximum value of the intensity and energy of the amplitude of the frame included in the bin as the representative value. For example, the second generation unit computes the median value of the intensity and energy of the amplitude of the frame included in the bin as the representative value. For example, the second generation unit computes an average value such as an arithmetic average value, geometric average value, or harmonic mean of the intensity and energy of the amplitude of the frame included in the bin as the representative value. The second generation unit 13 may calculate the variance of the intensity and energy of the amplitude for each bin and generate the second spectrum based on the computed variance. For example, the second generation unit computes the variance of the intensity and energy of the amplitude of the frame included in the bin.

Figure 5:
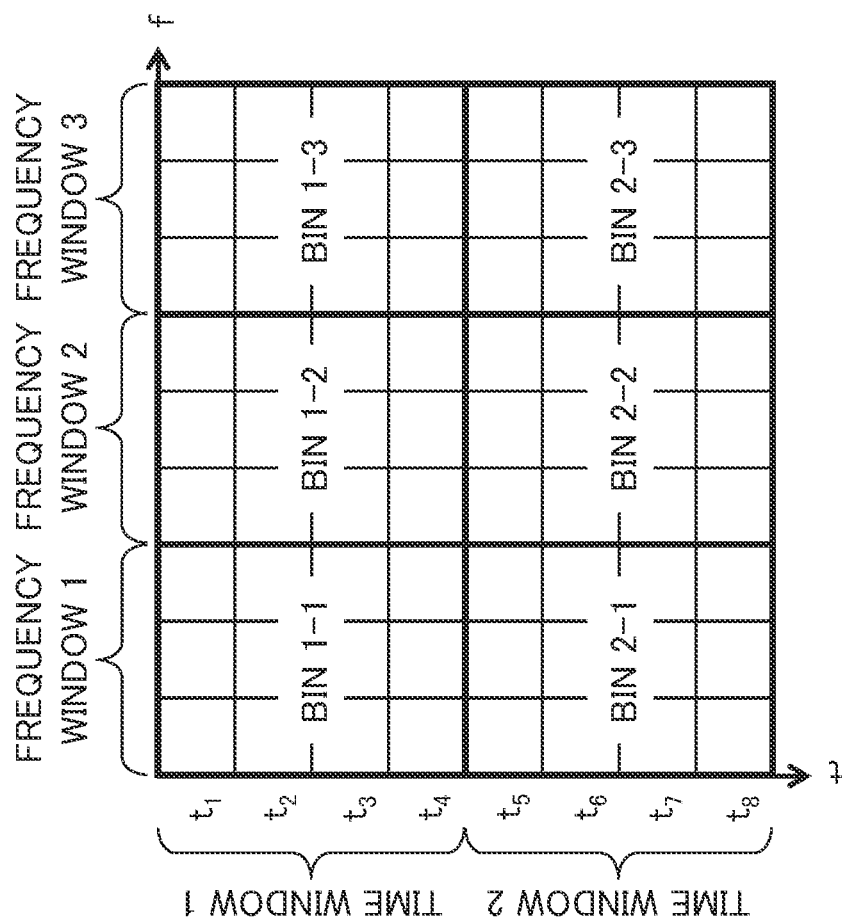
FIG. 5 is a schematic diagram for illustrating a second spectrum generated by a second generation unit of the wave motion signal processing device according to the first example embodiment.

FIG. 5 is a schematic diagram for illustrating the second spectrum generated by the second generation unit 13. The second spectrum in FIG. 5 is based on the generated first spectrum of FIG. 4. In the example of FIG. 5, a bin obtained by cutting out a frequency spectrum at a unit frequency (also referred to as a frequency window) is configured for each unit time (also referred to as a time window) including a plurality of times (time $t_1$, time $t_2$, time $t_3$, . . . ). In the example of FIG. 5, the time window is set every 4 frames (4 squares) setting and the frequency window is set every 3 frames (3 squares). Hereinafter, bins cut out in the time window m and frequency window n are denoted as bins m-n (m and n are natural numbers). For example, a bin cut out in the time window 1 and frequency window 2 is denoted as bin 1-2.

The extraction unit 14 extracts a peak (also referred to as a first peak) satisfying a predetermined condition with regard to the amplitude (also referred to as an extraction condition) from each bin of the second spectrum. The extraction unit 14 may extract a plurality of peaks satisfying the extraction condition from each bin of the second spectrum. The extraction unit 14 extracts peaks from a plurality of bins having a common time window in chronological order of the time windows. Hereinafter, a plurality of bins having a common time window is also referred to as a time bin. The time-series data of the frequency the having the extracted peak as a starting end is referred to as a peak waveform. The peak (first peak) extracted by the extraction unit 14 is a starting end (also referred to as a peak starting end) of the peak waveform. In other words, the extraction unit 14 extracts the peak starting end of the peak waveform from the time bin of the second spectrum. Among the peaks configuring the peak waveform, a peak following the peak starting end (also referred to as a second peak) is tracked by the tracking unit 15.

The extraction condition includes the following conditions (first to fifth extraction conditions). The following first to fifth extraction conditions are set for amplitude values (intensity, energy) of the plurality of bins of the second spectrum. The extraction condition is also used for tracking a peak (second peak) in the first spectrum.

The first extraction condition is a condition that the representative value generated by the second generation unit 13 is equal to or more than the threshold. The representative value in the first extraction condition is, for example, an average value, a median value, or a maximum value of the intensity and energy of the amplitude. The representative value in the first extraction condition does not include a variance. The threshold set in the first extraction condition is also referred to as a first threshold.

The second extraction condition is a condition that the representative value generated by the second generation unit 13 that is divided by a noise level is equal to or more than the threshold. The representative value in the second extraction condition is, for example, an average value, a median value, or a maximum value of the intensity and energy of the amplitude. The representative value in the second extraction condition does not include a variance. The threshold set in the second extraction condition is also referred to as a second threshold. For example, the noise level may be computed based on the input signal acquired at the time when the wave motion is not detected.

The third extraction condition is a condition that the sharpness of the representative value generated by the second generation unit 13 is equal to or more than the threshold. The representative value in the third extraction condition is, for example, an average value, a median value, or a maximum value of the intensity and energy of the amplitude. The representative value in the third extraction condition does not include a variance. The threshold set in the third extraction condition is also referred to as a third threshold. The third extraction condition indicates that the representative value in the target frequency bin is sufficiently larger than the representative values in the preceding and subsequent frequency bins.

The fourth extraction condition is a condition that the variance generated in the second generation unit 13 is equal to or less than the threshold. The variance in the fourth extraction condition is, for example, the variance of the intensity and energy of the amplitude. The fourth extraction condition is a condition with regard to not the representative value but the variance. The threshold set in the fourth extraction condition is also referred to as a fourth threshold.

The fifth extraction condition is a condition that the representative value generated by the second generation unit 13 has a maximum value. The representative value in the fifth extraction condition is, for example, an average value, a median value, or a maximum value of the intensity and energy of the amplitude. The representative value in the fifth extraction condition does not include a variance.

The extraction condition only needs to satisfy at least one of the first to fifth extraction conditions. For example, only one or all of the extraction conditions may be satisfied. The thresholds of the first to fifth extraction conditions are individually set for the parameters verified under the respective extraction conditions. The extraction conditions are not limited to the first to fifth extraction conditions as long as peak candidates may be detected from the first spectrum and second spectrum.

The tracking unit 15 calculates a frequency (also referred to as a peak frequency) at which the amplitude of each bin from which the peak starting end is extracted is maximized. The tracking unit 15 calculates a change amount of frequency (also referred to as a frequency change amount) inside each bin from which the peak starting end is extracted. For example, the slope of a straight line obtained by linearly regressing the frequency inside each bin is computed as the frequency change amount.

The tracking unit 15 detects, from the first spectrum, a peak (second peak) following the peak starting end extracted from each bin based on the peak starting end extracted from each bin and the peak frequency and frequency change amount with regard to each bin. The tracking unit 15 detects the first frame that satisfies any one of the first to fifth extraction conditions among the frames in the bin from which the starting end peak is extracted, and sets the first frame as the starting end frame (frame 1). The tracking unit 15 determines a frequency change amount (slope) between the frame 1 and the frequency frame (frame 2) satisfying the extraction condition in the next time frame. The tracking unit 15 calculates a frequency prediction value of the second peak based on the frequency change amount between the frame 1 and frame 2. The tracking unit 15 identifies a frequency frame (frame 3) satisfying the extraction condition in the frame 2 and the next time frame based on the computed frequency prediction value. The tracking unit 15 identifies a frequency frame (frame 4) satisfying the extraction condition in the frame 3 and the next time frame based on the frequency change amount between the frame 2 and frame 3. The tracking unit 15 repeats such processing to track the peak. Although an example in which the next frame is identified from two frames is described above, the next frame may be identified based on three or more frames. For example, a frequency change amount for 5 frames (frames 1 to 5) may be determined, and a frequency frame (frame 6) following the frame 5 may be determined based on the frequency change amount. However, since the frequency change amount cannot be computed from only one frame, at least two frames are required to compute the frequency change amount.

Figure 6:
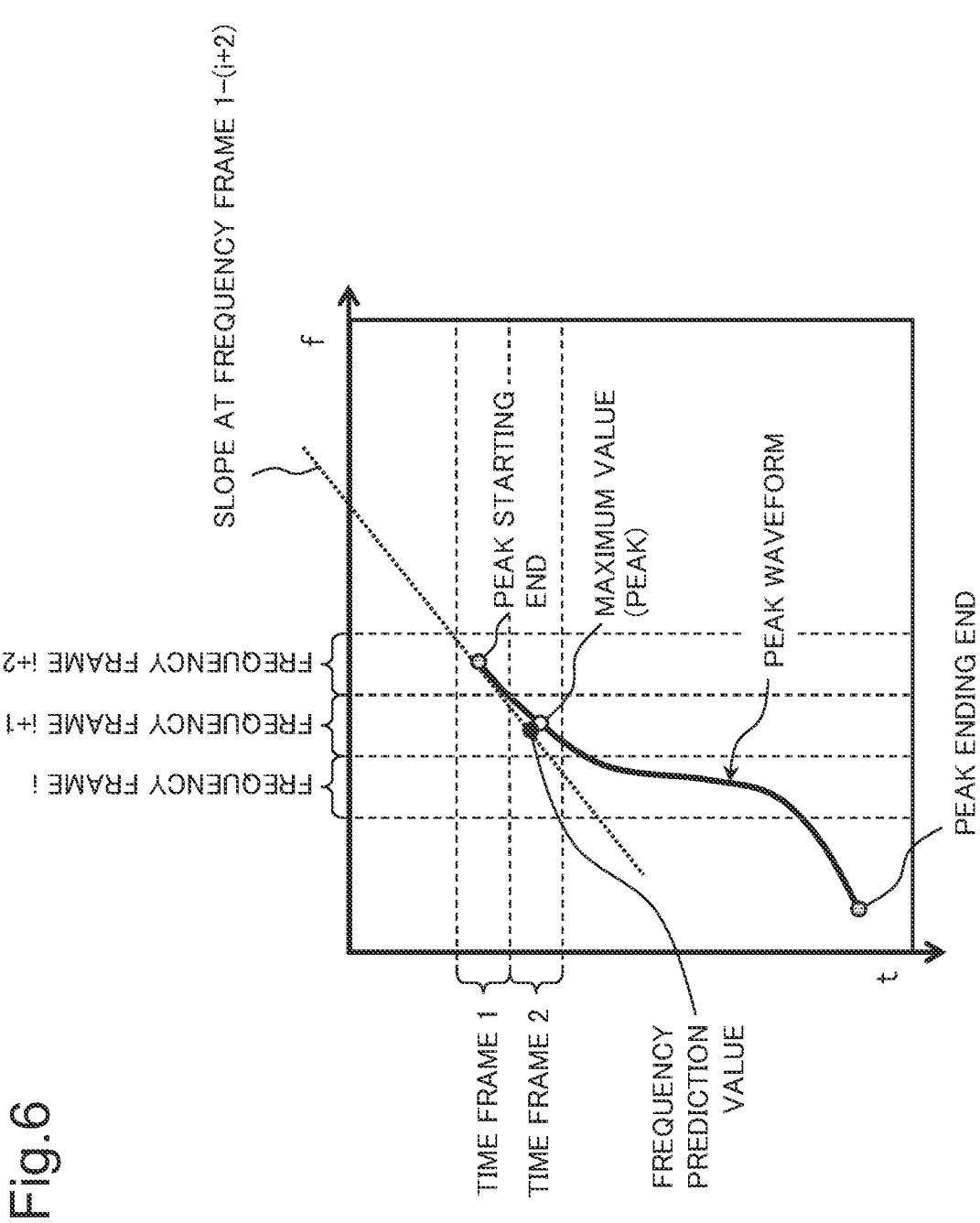
FIG. 6 is a schematic diagram for illustrating an example of peak tracking by a tracking unit of the wave motion signal processing device according to the first example embodiment.

FIG. 6 is a schematic diagram for illustrating the peak tracking by the tracking unit 15. FIG. 6 shows a curve (peak waveform) joining the peaks tracked in the first spectrum. The tracking unit 15 computes a predicted value (referred to as a frequency prediction value) of the frequency of the peak in the time frame 2 following the time frame 1 from which the peak starting end is extracted. For example, the tracking unit 15 calculates the frequency prediction value $F_p(2)$ in the time frame 2 using the following formula 1-1. In the following formula 1-1, $s(1)$ is a change amount (slope) of the frequency in the time frame 1. $F_p(1)$ is the frequency of the peak starting end in the time frame 1. $\Delta t(2)$ is a time difference between the middle time of the time frame 1 and the middle time of the time frame 2.

$$F_p(2) = F_p(1) - s(1) \times \Delta t(2) \qquad (1\text{-}1)$$

The tracking unit 15 extracts a peak satisfying the extraction condition from the first spectrum within a range (also referred to as a tracking range) in accordance with the frequency prediction value. For example, the tracking range is set based on a frequency band in which the Doppler shift may occur with the motion of the wave source and the frequency prediction value. For example, the tracking unit 15 detects a peak with regard to the frequency F within the tracking range represented by the following formula 1-2.

$$F_p(2) - \beta < F < F_p(2) + \beta \qquad (1\text{-}2)$$

For example, the above formula 1-2, $\beta$ is set to a range in which the Doppler shift with the motion of the wave source may occur. $\beta$ may be set to a different value for each frequency prediction value Fp(2). For example, 3 is determined based on the Doppler shift formula in accordance with the velocity of the sound source. $\beta$ may be set for each wave source, or a constant value may be set regardless of the wave source. In the example of FIG. 6, the tracking unit 15 predicts the frequency prediction value based on the slope in the frequency frame i+2 included in the time frame 1. The tracking unit 15 extracts a maximum value satisfying the extraction condition as the peak of the time frame 2 within a tracking range in accordance with the predicted frequency prediction value. The tracking unit 15 tracks the extracted peak of the time frame 2 and the peak starting end used to extract the peak as elements configuring a peak waveform based on the same wave source.

When the tracking range is set, the extraction unit 14 extracts, from the second spectrum, a new starting end peak satisfying the extraction outside the tracking range condition in a time frame after the time frame 2 following the target time frame 1. The extraction of the new peak starting end by the extraction unit 14 may be started at any timing as long as the tracking range is set. Similarly to the peak starting end extracted in the time frame 1, the tracking unit 15 tracks the peak for the peak starting end that is newly extracted in the time frame 2.

The tracking unit 15 tracks the peak in temporally consecutive time frames even after the time frame 3. For example, the tracking unit 15 calculates the frequency prediction value $F_p(w)$(w is a natural number equal to or more than 3) in the time frame 3 after the time frame w using the following formula 1-3. In the following expression 1-3, s(w−1) is the frequency change amount (slope) in the time frame w−1. $F_p(w−1)$ is the frequency of the peak starting end in the time frame w−1. Δt(w) is the time difference between the middle time of the time frame w−1 and the middle time of the time frame w.

$$F_p(w) = F_p(w-1) - s(w-1)\Delta t(w) \tag{1-3}$$

The tracking unit 15 extracts, from the first spectrum, a peak satisfying the extraction condition within the tracking range even after the time frame 3. For example, the tracking unit 15 detects a peak with regard to the frequency F within the tracking range represented by the following formula 1-4. The following expression 1-4 β may be the same as or different from β in the above described formula 1-2.

$$Fp(w) - \beta < F < Fp(w) + \beta. \tag{1-4}$$

When no peak is extracted in the time frame following the time frame from which the peak is extracted, the tracking unit 15 extracts, from the first spectrum, the peak of the wave motion during tracking that satisfies the extraction condition within the tracking range of the peak extracted last. For example, when no peak is extracted before a predetermined time elapses, the tracking range may be expanded in accordance with the lapse of time.

The tracking unit 15 continues the peak tracking until a predetermined time set in advance elapses. The predetermined time is set in accordance with a time range in which the wave motion may be detected. For example, the predetermined time is set in accordance with the type of the wave source. If the wave source is an automobile, when the wave motion is not detected beyond an assumed stop time such as waiting for a traffic light, it may be considered that the automobile is parked. In this case, the assumed stop time may be set to the predetermined time. For example, when a wave motion for which tracking has ended is extracted again after a predetermined time has elapsed, it may determine that the automobile has restarted traveling.

When a predetermined time elapses without extraction of a peak, the tracking unit 15 determines that the peak extracted last is the ending end (also referred to as a peak ending end).

With regard to the peak tracked by the tracking unit 15, the waveform generation unit 16 generates time-series data (also referred to as a peak waveform) of the frequency of the peak from the peak starting end to the peak ending end.

Figure 7:
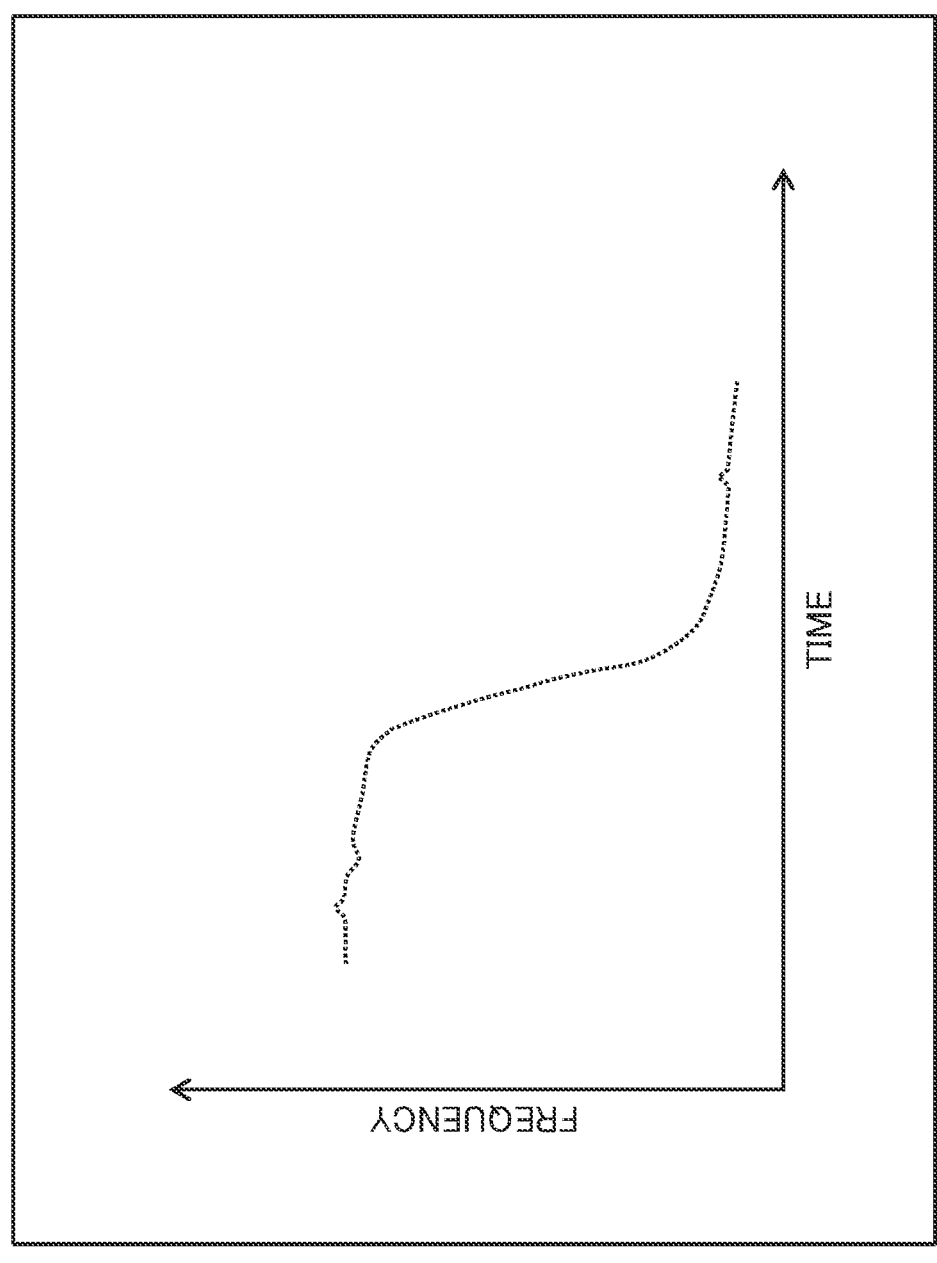
FIG. 7 is a schematic diagram for showing an example of a peak waveform generated by a waveform generation unit of the wave motion signal processing device according to the first example embodiment.

FIG. 7 is a graph showing an example of a peak waveform generated by the waveform generation unit 16. The peak waveform in FIG. 7 shows a peak waveform based on the peak tracked in the first spectrum in FIG. 7. The peak waveform is generated for each wave source.

The waveform generation unit 16 deletes overlapping waveforms with regard to the plurality of generated peak waveforms. For example, the waveform generation unit 16 may integrate partially overlapping waveforms with regard to the plurality of generated peak waveforms. For example, when the length of the peak waveform (time length) is less than a predetermined length, the waveform generation unit 16 may delete the peak waveform. For example, the waveform generation unit 16 stores the generated peak waveform in a storage unit (not-shown). For example, the waveform generation unit 16 outputs the generated peak waveform to an external system (not-shown). For example, the peak waveform generated by the waveform generation unit 16 is used for applications such as trajectory estimation of the wave source and identification of the sound source. The trajectory estimation of the wave source will be described in a second example embodiment. With regard to identification of the sound source, information about the peak waveform may be used to generate the basis (frequency) used to estimate the type of the sound source. For example, data recording the sound emitted by the sound source A moving as learning data is input, one or more peak waveforms are generated. Since the frequency at the inflection point of the peak waveform relates to the frequency of the sound source A, this may be learned as the basis of the sound source A. When an unknown sound source X is identified, the weight (H) may be computed using non-negative matrix factorization (NMF)(the following formula 1-5) based on the frequency spectrum (V) of the sound source X and the basis (W) of the sound source A.

$$V \approx WH \tag{1-5}$$

The above weight H is above a preset threshold, the sound source X may be identified as the sound source A. Since it is highly likely that the frequency of the sound source X also varies due to the Doppler effect, the variation range df of the frequency may be calculated as W±df instead of the basis W. Alternatively, as a simpler identification method, when the frequency estimated based on the peak waveform of an unknown sound source X is the same as or close to the frequency of the learned sound source A, the sound source X may be identified as the sound source A. In the above description, an example has been described in which one sound source is identified, but a plurality of sound sources may be identified.

Among the peak waveforms generated by the waveform generation unit 16, a waveform based on a signal from a wave source included in the mobile object is here referred to as the Doppler shift. Assuming that the mobile object includes a single wave source and no peak waveform due to noise is observed, all generated peak waveforms correspond to the Doppler shift. Assuming that the mobile object includes a plurality of wave sources and a peak waveform due to noise is observed, all generated peak waveforms include Doppler shifts and noise components related to the plurality of wave source.

In the above method, an example has been described in which a first spectrum with high resolution is generated and a second spectrum with low resolution is generated using the first spectrum. For example, it may be configured that a second spectrum with low resolution is generated without generating a first spectrum with high resolution, and a tracking range around a peak extracted from the second spectrum is partially set to high resolution to track the peak. If the tracking range is configured to be partially set to high resolution, it is not necessary to generate the first spectrum with high resolution for all times and frequencies. Therefore, the calculation amount may be less than when the first spectrum is generated first.

(Operation)

Figure 8:
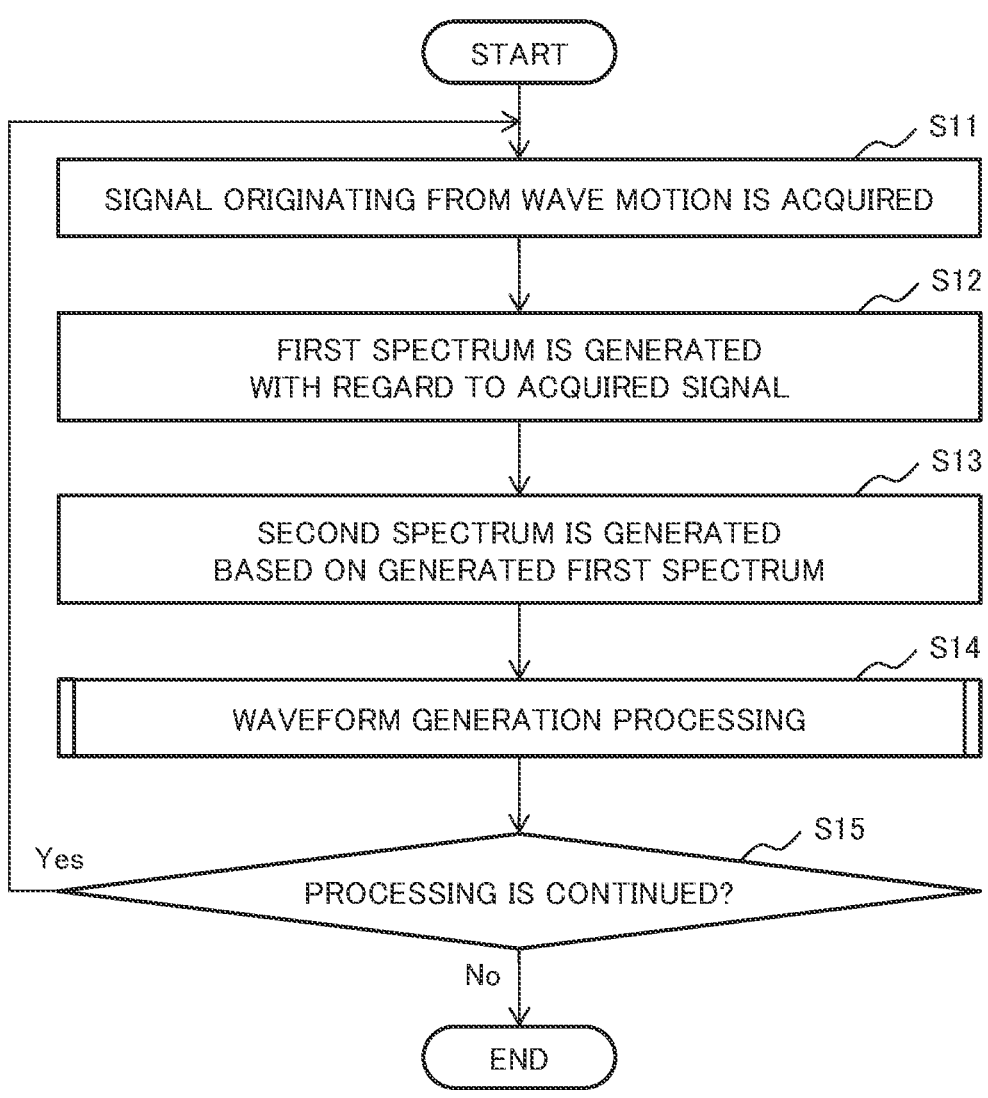
FIG. 8 is a flowchart for illustrating an example of an overview of an operation of the wave motion signal processing device according to the first example embodiment.

Next, the operation of the wave motion signal processing device 10 according to the present example embodiment will be described with reference to the drawings. FIG. 8 is a flowchart for illustrating the outline of the operation of the wave motion signal processing device 10. The process along the flowchart in FIG. 8 will be described with the wave motion signal processing device 10 as the main body of the operation.

In FIG. 8, first, the wave motion signal processing device 10 acquires a signal originating from the wave motion detected by the plurality of sensors 100 (step S11).

Next, the wave motion signal processing device 10 generates a first spectrum with high resolution for the acquired signal (step S12).

Next, the wave motion signal processing device 10 generates a second spectrum with low resolution based on the generated first spectrum (step S13).

Next, the wave motion signal processing device 10 performs waveform generation processing (step S14). Details of the waveform generation processing in step S14 will be described below.

If the process is continued after step S14 (Yes in step S15), the process returns to step S11. If the process is not continued after step S14 (No in step S15), the process along the flowchart in FIG. 8 is ended. For example, a scheduled number of times of processes is performed or a scheduled processing time has elapsed, the process is stopped. For example, it may be configured that the process is stopped in accordance with the user's operation.

[Waveform Generation Processing]

Figure 9:
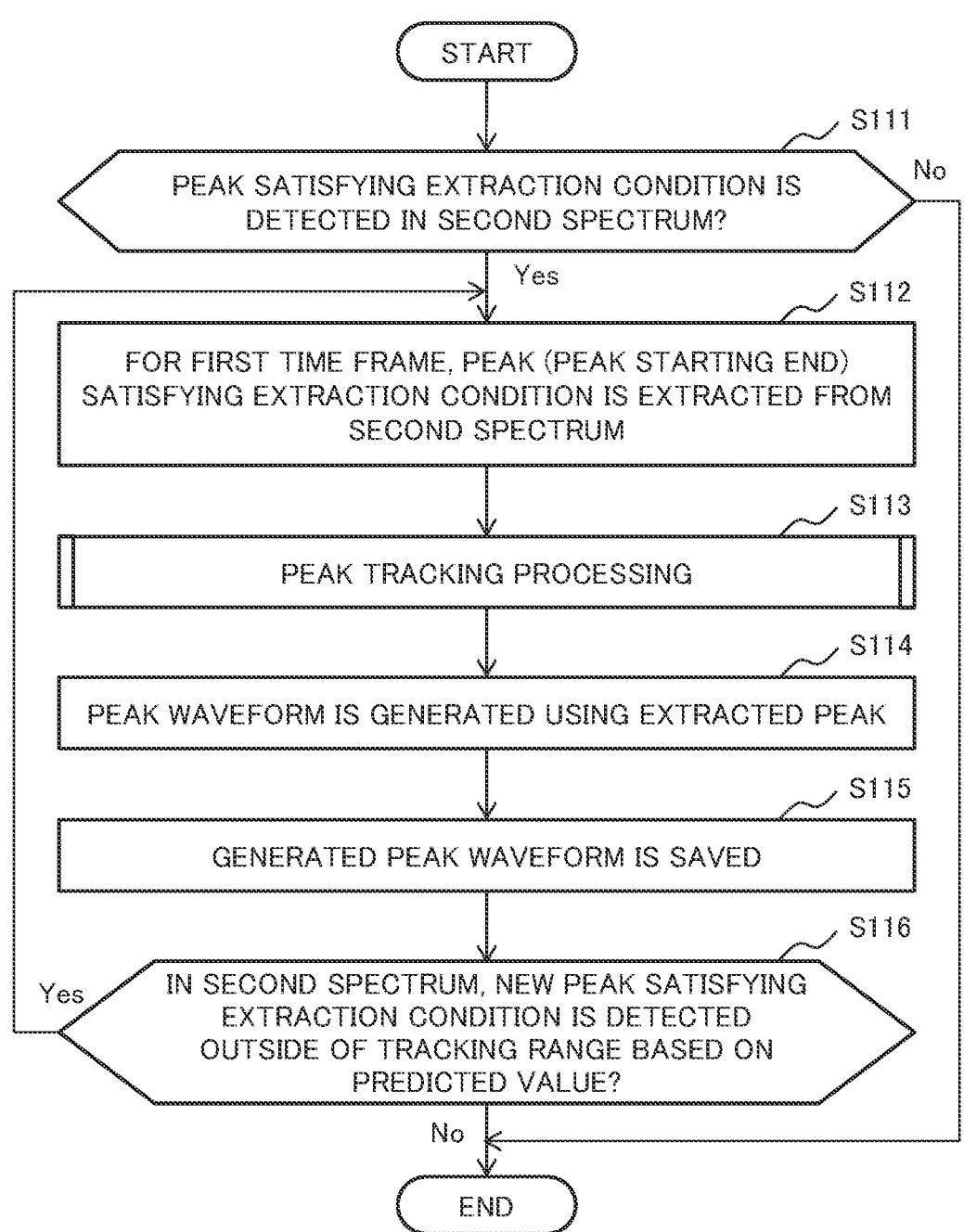
FIG. 9 is a flowchart for illustrating an example of waveform generation processing by the wave motion signal processing device according to the first example embodiment.

Next, details of the waveform generation processing (step S14 in FIG. 8) by the wave motion signal processing device 10 will be described with reference to the drawings. FIG. 9 is a flowchart for illustrating the waveform generation processing. The process along the flowchart in FIG. 9 will be described with the components of the wave motion signal processing device 10 as the main body of the operation.

In FIG. 9, if a peak satisfying the extraction condition is detected in the second spectrum (Yes in step S111), the extraction unit 14 extracts, from the second spectrum, the peak satisfying the extraction condition for the first time frame (step S112). The peak extracted in step S112 corresponds to the peak starting end (first peak) of the peak waveform. If a peak satisfying the extraction condition is not detected in the second spectrum (No in step S111), the process along the flowchart in FIG. 9 is ended (the process proceeds to step S15 in FIG. 8).

After step S112, the tracking unit 15 performs peak tracking processing (step S113). Details of the peak tracking processing in step S113 will be described below.

Next, the waveform generation unit 16 uses the peak tracked in the peak tracking processing in step S113 to generate a peak waveform (step S114).

Next, the waveform generation unit 16 stores the generated peak waveform (step S115). The waveform generation unit 16 may output the generated peak waveform to the outside.

If a new peak satisfying the extraction condition is detected outside the tracking range based on the predicted value in the second spectrum (Yes in step S116), the process returns to step S112. Then, peak tracking is performed for the newly detected peak. If a new a peak satisfying the extraction condition is not detected outside the tracking range based on the predicted value in the second spectrum (No in step S116), the process along the flowchart in FIG. 9 is ended (the process proceeds to step S15 in FIG. 8).

[Peak Tracking Processing]

Figure 10:
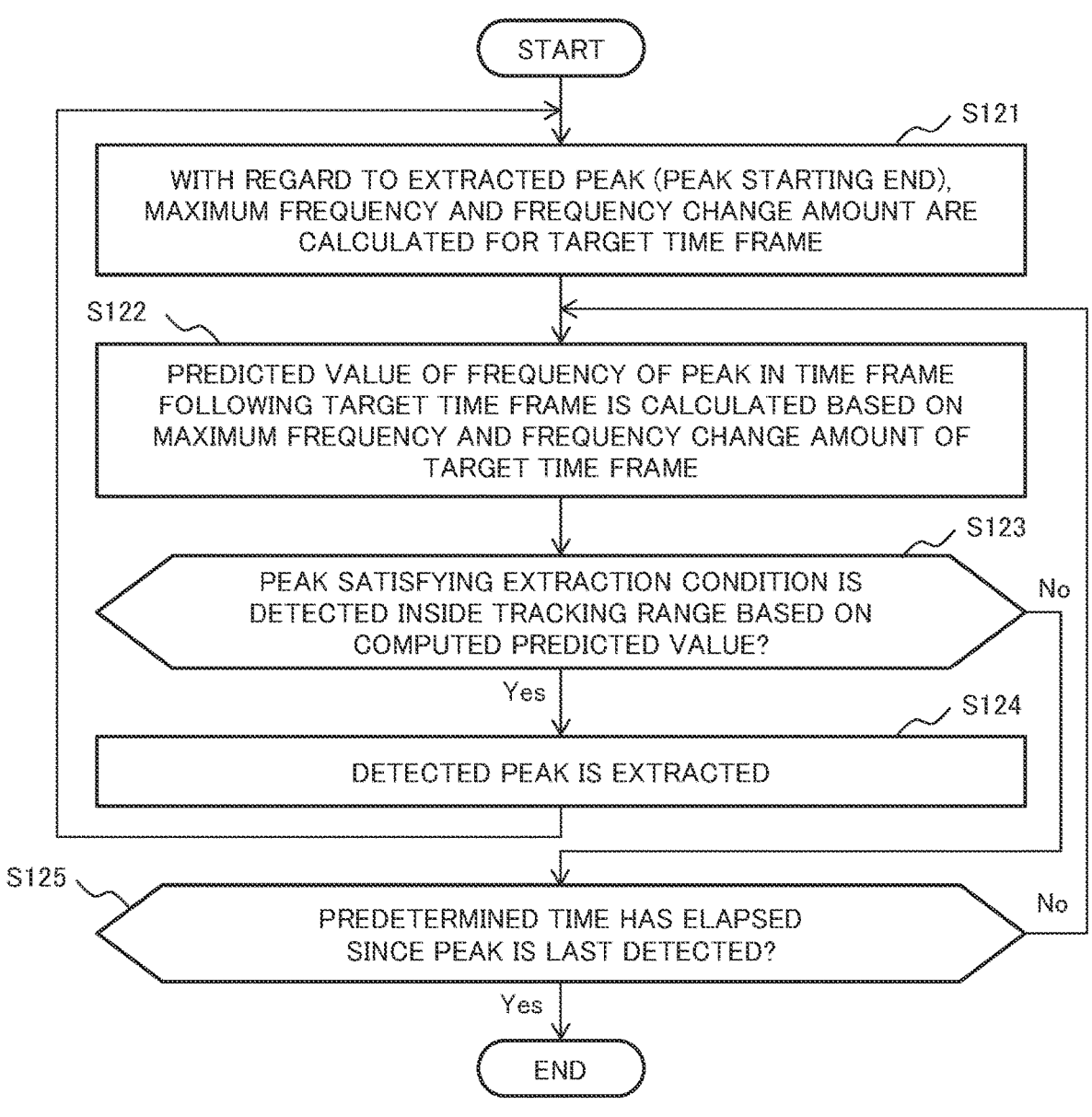
FIG. 10 is a flowchart for illustrating an example of peak tracking processing by the wave motion signal processing device according to the first example embodiment.

Next, details of the peak tracking processing (step S113 in FIG. 9) by the wave motion signal processing device 10 will be described with reference to the drawings. FIG. 10 is a flowchart for illustrating the peak tracking processing. The peak tracking processing is performed in the first spectrum with high resolution. The process along the flowchart in FIG. 10 will be described with the components (tracking unit 15) of the wave motion signal processing device 10 as the main body of the operation.

In FIG. 10, first, the tracking unit 15 calculates the maximum frequency and frequency change amount for the target time frame with regard to the peak (peak starting end) extracted in step S112 in FIG. 9 (step S121). When the target time frame is the first time frame, the tracking unit 15 calculates the maximum frequency and frequency change amount for the peak starting end (first peak). When the target time frame is not the first time frame, the tracking unit 15 calculates the maximum frequency and frequency change amount for the peak (second peak) extracted based on the peak starting end.

Next, the tracking unit 15 calculates a predicted value of the frequency of the peak in the time frame following the target time frame based on the maximum frequency and frequency change amount of the target time frame (step S122). The time frame following the target time frame may or may not be temporally consecutive with the target time frame as long as it is after the target time frame.

If a peak satisfying the extraction condition is detected within the tracking range based on the computed predicted value (Yes in step S123), the tracking unit 15 extracts the detected peak (second peak)(step S124). After step S124, the process returns to step S121, the subsequent time frame is set as the target time frame, and the peak tracking processing is continued.

If a peak satisfying the extraction condition is not detected within the tracking range based on the computed predicted value (No in step S123), different processing is performed in accordance with the time elapsed since the peak is last detected. If a predetermined time has not elapsed since the peak is last detected (No in step S125), the process returns to step S122, and the peak tracking processing is continued for the target time frame in process. If a predetermined time has elapsed since the peak is last detected (Yes in step S125), the process along the flowchart in FIG. 10 is ended (the process proceeds to step S114 in FIG. 9).

As described above, the wave motion signal processing device according to the present example embodiment includes the signal input unit, the first generation unit, the second generation unit, the extraction unit, the tracking unit, and the waveform generation unit. The signal input unit receives a signal originating from a wave motion detected by at least one sensor as an input. The first generation unit generates a first spectrum with high resolution based on the input signal. The second generation unit generates a second spectrum with low resolution. The extraction unit extracts, from the second spectrum, a first peak satisfying the extraction condition in the target time frame. The tracking unit tracks, in the first spectrum, the second peak satisfying the extraction condition for the time frame following the target time frame from which the first peak is extracted. The waveform generation unit generates a peak waveform that is time-series data of a frequency including a plurality of second peaks with the first peak as the starting end.

In the present example embodiment, the starting end (first peak) of the peak waveform is extracted in the second spectrum with low resolution, and the peak (second peak) following the starting end (first peak) is tracked in the first spectrum with high resolution. Therefore, according to the present example embodiment, it may be possible to alleviate the load on the processing of the signal originating from the wave motion by alleviating the processing of extracting the starting end (first peak) of the peak waveform. According to the present example embodiment, it may be possible to alleviate the processing without degrading the frequency estimation accuracy, since the tracking of the peak (second peak) following the starting end (first peak) is performed in the first spectrum with high resolution.

In one aspect of the present example embodiment, the first generation unit converts, for each time frame, the input signal in the time domain into a frequency spectrum that is a signal in a frequency domain. The first generation unit arranges the frequency spectrum in time series to generate the first spectrum. The second generation unit calculates a representative value of an amplitude of a frequency for each bin obtained by cutting out the first spectrum at a unit frequency for each unit time using the first spectrum, and generates the second spectrum based on the computed representative value. The tracking unit tracks sequentially extracts, in the first spectrum, a second peak satisfying the extraction condition for a plurality of time frames following the target time frame. The tracking unit tracks a plurality of second peaks following the first peak by sequentially extracting, in the first spectrum, a second peak satisfying the extraction condition.

In the present aspect, the first peak (starting end) is extracted from the second spectrum with low resolution in time and frequency. Therefore, according to the present aspect, it may possible to alleviate the load of the processing of extracting the first peak (starting end).

In one aspect of the present example embodiment, the first generation unit converts, for each time frame, the input signal in the time domain into a frequency spectrum that is a signal in a frequency domain. The second generation unit thins out frequency components of the frequency spectrum, arranges the frequency spectrum from which frequency components are thinned out in time series to generate the second spectrum. The first generation unit locally generate the first spectrum by increasing resolution around where the first peak and second peak are extracted. The tracking unit sequentially extracts a second peak satisfying the extraction condition in the locally generated first spectrum for a plurality of time frames following the target time frame. The tracking unit tracks a plurality of the second peaks following the first peak by sequentially extracting the second peak satisfying the extraction condition in the locally generated first spectrum.

In the present aspect, it is not necessary to generate the first spectrum with high resolution over the entire frequency domain since the resolution of the time and frequency around the peak is increased in tracking the peak. Therefore, according to the present aspect, it may be possible to alleviate the load of processing in generating the spectrum.

In one aspect of the present example embodiment, the extraction unit calculates, with regard to the first peak extracted from a bin of the target time frame, a peak frequency at which an amplitude inside the bin is maximum and a frequency change amount. The tracking unit estimates a frequency prediction value of a peak following the first peak based on the peak frequency and the frequency change amount. The tracking unit detects, within a tracking range in accordance with the estimated frequency prediction value, the second peak satisfying the extraction condition from the time frame following the target time frame. The tracking unit tracks, with regard to a time frame following the time frame from which the second peak is detected, a second peak following the first peak by sequentially detecting the second peak following the second peak.

In the present aspect, based on the peak frequency and frequency change amount (slope) in the preceding time frame, the position of the second peak of the subsequent time frame is estimated. Therefore, according to the present aspect, robustness against noise is higher than that in a method extracting a peak based only on the maximum value.

In one aspect of the present example embodiment, when a predetermined time has elapsed since the second peak is last detected, the tracking unit determines that the second peak detected last is a third peak at the ending end. The waveform generation unit generates the peak waveform that has the first peak as a starting end, passes through a plurality of the second peaks, and has the third peak as an ending end.

In the present aspect, the ending end of the peak waveform is extracted in accordance with the time elapsed since the second peak is last detected. Therefore, according to the present aspect, it may be possible to alleviate the peak tracking processing since the peak is not continuously tracked wastefully by ending the tracking of the peak waveform in accordance with the time elapsed. According to the present aspect, since the ending end of the peak waveform is clearly determined in accordance with the time elapsed, the length of the peak waveform (time length) may be clearly determined.

In one aspect of the present example embodiment, the spectrum generation unit calculates at least one of a representative value and a variance with regard to an amplitude of the time frame included in the bin of the target time frame. The extraction condition includes at least one condition of a first extraction condition, a second extraction condition, a third extraction condition, a fourth extraction condition, and a fifth extraction condition. The first extraction condition is a condition that the representative value is equal to or more than a first threshold. The second extraction condition is a condition that the representative value divided by a noise level is equal to or more than a second threshold. The third extraction condition is a condition that sharpness of the representative value is equal to or more than a third threshold. The fourth extraction condition is a condition that the variance is equal to or less than a fourth threshold. The fifth extraction condition is a condition that the representative value has a maximum value. According to the present aspect, since a peak is extracted based on a clear extraction condition and the quality of the extracted peak is maintained, it may be possible to alleviate the load of processing spent for extracting a useless peak.

In one aspect of the present example embodiment, with regard to the overlapping peak waveforms, the waveform generation unit leaves one peak waveform and deletes the other peak waveforms. With regard to the peak waveform that has a time length less than a predetermined length, the waveform generate unit deletes the peak waveform. According to the present aspect, it may be possible to reduce the area for storing the peak waveform by deleting the unnecessary peak waveform.

Second Example Embodiment

Next, a wave motion signal processing device according to a second example embodiment will be described with reference to the drawings. The wave motion signal processing device according to the present example embodiment estimates a time change and a velocity (hereinafter, referred to as a trajectory) of a position of a mobile object having the wave source of the wave motion based on the wave motion detected by a plurality of sensors. In the present example embodiment, it is assumed that the mobile object has at least one wave source, and each wave source emits a single wave motion. In the present example embodiment, with regard to the same mobile object, it is assumed that the Doppler shift amount is the same for all wave sources. In the present example embodiment, the frequency band of the wave motion detected by the sensor is a band width in which a change due to the Doppler effect may detected.
(Configuration)

Figure 11:
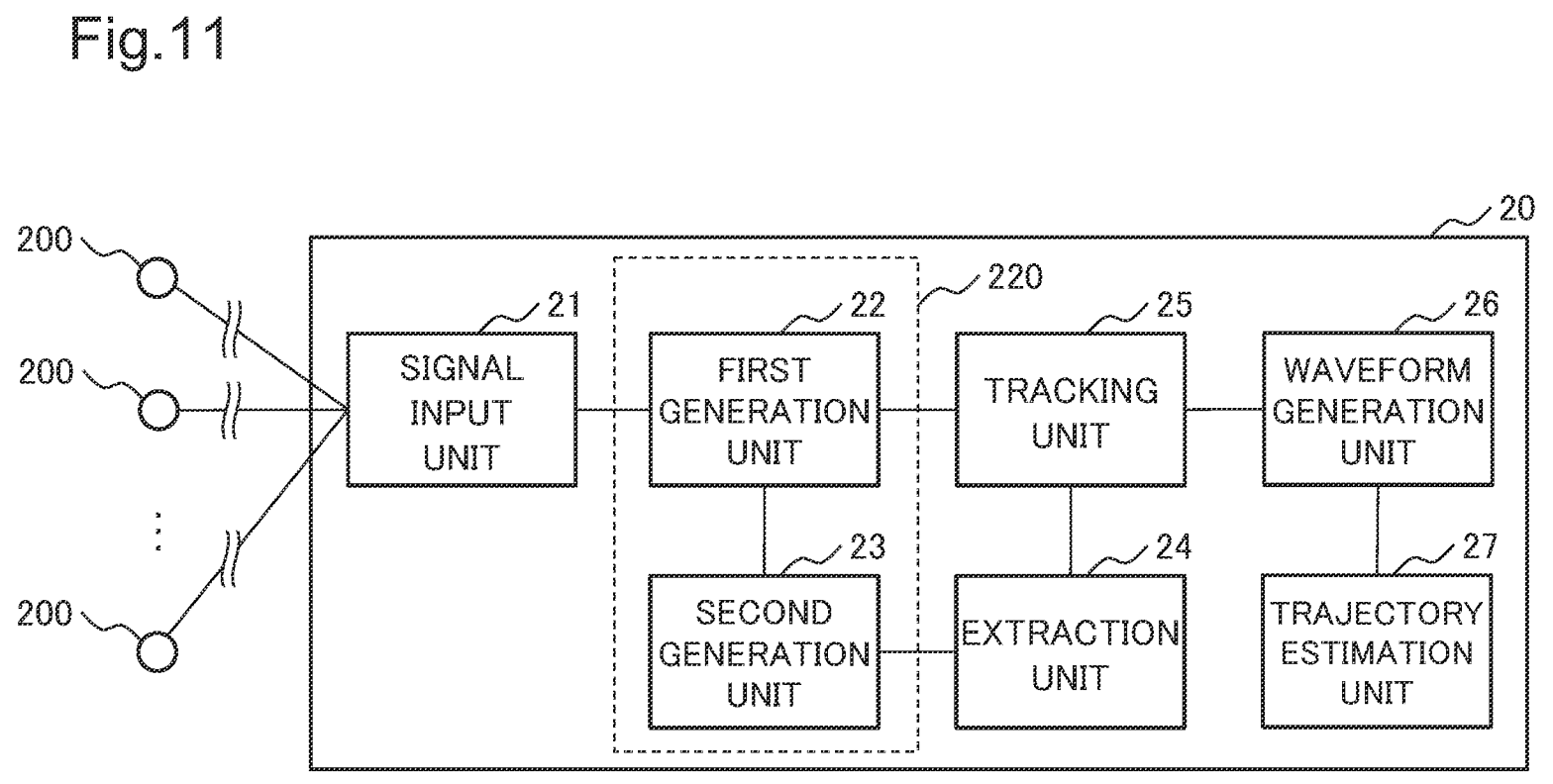

FIG. 11 is a block diagram illustrating an example of a configuration of the wave motion signal processing device 20 according to the present example embodiment. The wave motion signal processing device 20 includes a signal input unit 21, a first generation unit 22, a second generation unit 23, an extraction unit 24, a tracking unit 25, a waveform generation unit 26, and a trajectory estimation unit 27. The first generation unit 22 and second generation unit 23 configure a spectrum generation unit 220. Hereinafter, the first generation unit 22 and second generation unit 23 will be described as different configurations, but the first generation unit 22 and second generation unit 23 may be integrally configured as the spectrum generation unit 220. In the following description, points similar to those of the first embodiment will be simplified, and points different from those of the first embodiment will be focused.

As in the first example embodiment, the wave motion signal processing device 20 is connected to a plurality of sensors 200 arranged at intervals. The sensor 200 has the same configuration as the sensor 100 of the first example embodiment. A system including the wave motion signal processing device 20 and the plurality of sensors 200 is also referred to as a signal processing system.

The signal input unit 21 has the same configuration as the signal input unit 11 of the first example embodiment. The signal input unit 21 acquires a signal (also referred to as an input signal) originating from the wave motion detected by the plurality of sensors 200. The signal input unit 21 acquires the position of the sensor 200 at which the sensor 200 may detect the wave motion from the wave source. When the position of the sensor 200 is previously registered in a storage unit (not-shown) of the wave motion signal processing device 20, the signal input unit 21 acquires the previously registered position of the sensor 200. The signal input unit 21 may be connected to the plurality of sensors 200 in a wired manner or in a wireless manner. For example, the signal input unit 21 may be connected to the plurality of sensors 200 via a not-shown network.

Figure 12:
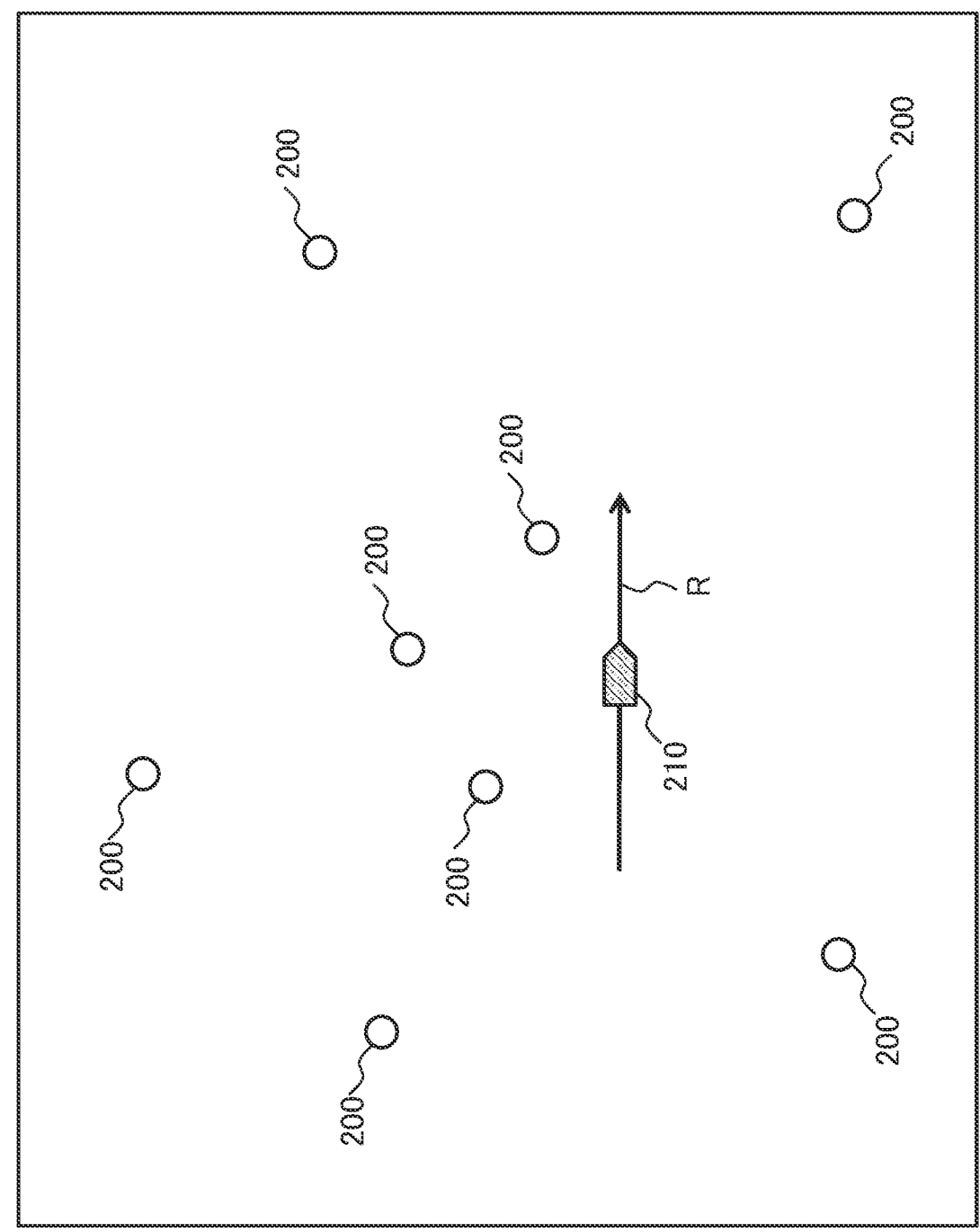
FIG. 12 is a schematic diagram for illustrating an arrangement example of a plurality of sensors that detect a wave motion that is the source of a signal input to the wave motion signal processing device according to the second example embodiment.

FIG. 12 is a schematic diagram showing an arrangement example of the plurality of sensors 200. In the space in which the plurality of sensors 200 is arranged, the mobile object 210 having the wave source moves. The trajectory with the motion of the mobile object 210 is the trajectory R to be estimated. The plurality of sensors 200 may be arranged in any manner as long as the position of each sensor 200 may be identified. For example, the plurality of sensors 200 may be arranged at regular intervals or at any intervals. The plurality of sensors 200 may change in positional relationship with each other as long as the position of each sensor may be determined. For example, a microphone, a vibration sensor, or the like mounted on a mobile terminal that may identify position information by global positioning system (GPS) or the like may be used as the sensor 200. Hereinafter, it is assumed that the mobile object 210 moves linearly at a constant velocity in the space in which the plurality of sensors 200 are arranged in a unit period used for estimating the trajectory R of the mobile object 210 having the wave source.

The first generation unit 22 has the same configuration as the first generation unit 12 of the first example embodiment. The first generation unit 22 performs Fourier transform on the input signal in the time domain in units (also referred to as a time frame) conforming to a certain rule to generate time-series data (also referred to as a frequency spectrum) in the frequency domain. The first generation unit 22 uses the plurality of generated frequency spectra to generate a high resolution spectrum (first spectrum also referred to as).

The second generation unit 23 has the same configuration as the second generation unit 13 of the first example embodiment. The second generation unit 23 coarsens the resolution of the generated first spectrum by the first generation unit 22 to generate a low resolution spectrum (also referred to as a second spectrum). The second generation unit 23 sets a cluster (also referred to as a bin) obtained by integrating a plurality of frames for each unit time and unit frequency based on the first spectrum. The second generation unit 23 calculates the representative value of the amplitude (intensity, energy) of the frame included in the bin to generate the second spectrum.

The extraction unit 24 has the same configuration as the extraction unit 14 of the first example embodiment. The extraction unit 24 extracts a peak satisfying the extraction condition from each bin based on the amplitude (intensity, energy) of each bin. The extraction unit 24 extracts peaks from a plurality of bins (time bins) having a common time frame in chronological order of the time frames. The extraction unit 24 extracts a peak starting end (first peak) of the peak waveform from the time bin of the second spectrum. Among the peaks configuring the peak waveform, the peak (second peak) following the peak starting end is tracked by the tracking unit 25.

The tracking unit 25 has the same configuration as the tracking unit 15 of the first example embodiment. The tracking unit 25 calculates the frequency (peak frequency) having the maximum amplitude inside each bin from which the peak starting end is extracted. The tracking unit 25 calculates a change amount of frequency (also referred to as a frequency change amount) inside each bin from which the peak starting end is extracted.

The tracking unit 25 detects, from the first spectrum, a peak (second peak) following the peak starting end extracted from each bin based on the peak starting end extracted from each bin and the peak frequency and frequency change amount with regard to each bin.

The tracking unit 25 extracts a peak satisfying the extraction condition from the first spectrum within a range (also referred to as a tracking range) in accordance with the frequency prediction value. For example, the tracking range is set based on a frequency band in which the Doppler shift may occur with the motion of the wave source and the frequency prediction value.

When the tracking range is set, the extraction unit 24 extracts a new starting end peak satisfying the extraction outside the tracking range condition in a time frame following the target time frame. The extraction of the new peak starting end by the extraction unit 24 may be started at any timing as long as the tracking range is set. Similarly to the peak (peak starting end) extracted in the target time frame, the tracking unit 25 tracks the peak for the peak starting end that is newly extracted in the subsequent time frame.

When no peak is extracted in consecutive time frames, the tracking unit 25 extracts the peak of the wave motion during the track satisfying the extraction condition in the first spectrum within the tracking range of the peak extracted last. The tracking unit 25 continues the peak tracking until a predetermined time set in advance elapses. For example, when no peak is extracted before a predetermined time elapses, the tracking range may be expanded in accordance with the lapse of time. When a predetermined time elapses without extraction of a peak, the tracking unit 25 determines that the peak extracted last is the ending end (also referred to as a peak ending end).

The waveform generation unit 26 has the same configuration as the waveform generation unit 16 of the first example embodiment. With regard to the wave motion tracked by the tracking unit 25, the waveform generation unit 26 generates time-series data (peak waveform) of the frequency of the peak from the peak starting end to the peak ending end.

The waveform generation unit 26 deletes overlapping waveforms with regard to the plurality of generated peak waveforms. For example, the waveform generation unit 26 may integrate partially overlapping waveforms with regard to the plurality of generated peak waveforms. For example, when the length of the peak waveform (time length) is less than a predetermined length, the waveform generation unit 26 may delete the peak waveform. The waveform generation unit 26 outputs the generated peak waveform to the trajectory estimation unit 27. The peak waveform generated by the waveform generation unit 26 is used to estimate the trajectory R of the mobile object 210 having the wave source.

Among the peak waveforms extracted by the waveform generation unit 26, a waveform based on a signal from the wave source of the mobile object 210, which is the estimation target of the trajectory R, is referred to as the Doppler shift. Assuming that the mobile object 210 includes a single wave source and no peak waveform due to noise is observed, all generated peak waveforms correspond to the Doppler shift. Assuming that the mobile object includes a plurality of wave sources and a peak waveform due to noise is observed, all generated peak waveforms include Doppler shifts and noise components related to the plurality of wave source.

The trajectory estimation unit 27 fits the acquired peak waveform to the theoretical formula f of the Doppler shift and estimates a parameter (also referred to as a trajectory parameter) with regard to the trajectory of the mobile object for each of the selected sensors 200. The trajectory estimation unit 27 estimates trajectory parameters such as the velocity v of the mobile object 210 having the wave source, the frequency $f_0$ of the wave motion generated by the wave source, the shortest distance a between the mobile object 210 and sensor 200, the time to when the mobile object comes closest to the sensor 200. It is assumed that the mobile object makes a uniform linear motion at a velocity v along the trajectory R in the time frame being verified. The trajectory estimation unit 27 estimates the trajectory parameter by fitting the theoretical formula f of the Doppler shift in the following formula 2-1 to the peak waveform fitting. In the following formula 2-1, $\theta(t)$ is an angle (also referred to as a wave source direction) formed by a straight line joining the mobile object and sensor 100 and the trajectory R of the mobile object having the wave source at time t. In the following formula 1, c is the velocity of the wave motion in the observation environment.

$$ f = \frac{c}{c - v\cos\theta(t)} f_0 = \frac{c}{c - \dfrac{v^2(t_0 - t)}{\sqrt{a^2 + v^2(t_0 - t)^2}}} f_0 \qquad (2\text{-}1) $$

Using the estimated trajectory parameters, the trajectory estimation unit 27 estimates a candidate (hereinafter, also referred to as a wave source direction candidate) of the wave source direction with regard to all pairs of the peak waveforms from among the peak waveforms measured by the three sensors 200. The trajectory estimation unit 27 uses the estimated wave source direction candidate to estimate a candidate of trajectory (hereinafter, also referred to as a trajectory candidate) of the mobile object.

For example, the trajectory estimation unit 27 uses the trajectory parameters estimated for each peak waveform to estimate the wave source direction candidate with regard to all pairs of the peak waveforms. The trajectory estimation unit 27 uses the following formula 2-2 to calculate a wave source direction candidate φ mn with regard to the sensor 100-*m* and sensor 100-*n* (m, n are natural numbers).

$$ \tan \Box_{mn} = \frac{a_n - a_m}{v(t_n - t_m)} \qquad (2\text{-}2) $$

In the above formula 2-2, m represents the identification number of the sensor 200-*m*, and n represents the identification number of the sensor 200-*n*. tm indicates a time (also referred to as a starting end time) when the mobile object 210 comes closest to the sensor 200-*m*, and am indicates the distance between the sensor 200-*m* and mobile object 210 at the starting end time tm. Likewise, $t_n$ indicates a time (also referred to as an ending end time) when the mobile object 210 comes closest to the sensor 200-*n*, and $a_n$ indicates the distance between the sensor 200-*n* and mobile object 210 at the ending end time $t_{n'}$. It is assumed that the shortest distance a between the mobile object 210 and sensor 200 and the wave source direction candidate $\varphi_{mn}$ have a clockwise direction positive with respect to a line segment joining the two sensors 200. However, it is assumed that the mobile object 210 performs a uniform linear motion in the time from the starting end time $t_m$ to the ending end time $t_n$.

The trajectory estimation unit 27 estimates a wave source direction candidate for each of the pairs of peak waveforms in accordance with the positional relationship between the two sensors 200 and trajectory. The positional relationship between the two sensors 200 and trajectory includes the following four cases (case A, case B, case C, and case D). The trajectory estimation unit 27 estimates a trajectory candidate for each of the four wave source direction candidates estimated for each case. Hereinafter, the four cases will be described individually with regard to the estimation of the wave source direction candidate $\varphi_{12}$ in accordance with the positional relationship between the two sensors 200 (sensor 200-1, sensor 200-2) and trajectory.

The case A is a case in which both two sensors 200 are located on the upper side with respect to the trajectory R of the mobile object 210. In the case A, the distance $a_1$ between the sensor 200-1 and mobile object 210 at time $t_1$ when the mobile object 210 comes closest to the sensor 200-1 is positive. The distance $a_2$ between the sensor 200-2 and mobile object at time $t_2$ when the mobile object 210 comes closest to the sensor 200-2 is also positive. In the case A, the wave source direction candidate $\varphi_{12}$ is positive.

The case B is a case in which the sensor 200-1 is located on the lower side and the sensor 200-2 is located on the upper side with respect to the trajectory R of the mobile object 210. In the case B, the distance $a_1$ between the sensor 200-1 and mobile object 210 at the time $t_1$ when the mobile object 210 comes closest to the sensor 200-1 is negative. The distance $a_2$ between the sensor 200-2 and mobile object 210 at the time $t_2$ when the mobile object 210 comes closest to the sensor 200-2 is positive. In the case B, the wave source direction candidate $\varphi_{12}$ is positive.

The case C is a case C in which both the sensor 200-1 and sensor 200-2 are located on the lower side with regard to the trajectory R of the mobile object. In the case C, the distance $a_1$ between the sensor 200-1 and mobile object 210 at the time $t_1$ when the mobile object 210 comes closest to the sensor 200-1 is negative. The distance $a_2$ between the sensor 200-2 and mobile object 210 at the time $t_2$ when the mobile object 210 comes closest to the sensor 200-2 is negative. In the case C, the wave source direction candidate $\varphi_{12}$ is negative.

The case D is a case in which the sensor 200-1 is located on the upper side and the sensor 200-2 is located on the lower side with respect to the trajectory R of the mobile object R. In the case D, the distance $a_1$ between the sensor 200-1 and mobile object 210 at the time $t_1$ when the mobile object 210 comes closest to the sensor 200-1 is positive. The distance $a_2$ between the sensor 200-2 and mobile object 210 at the time $t_2$ when the mobile object 210 comes closest to the sensor 200-2 is negative. In the case D, the wave source direction candidate $\varphi_{12}$ is negative.

The trajectory estimation unit 27 estimates the wave source direction candidate in the above described four cases for all combinations of the two sensors 200 selected from the three sensors 200. The trajectory estimation unit 27 estimates three overlapping trajectory candidates for all combinations of the three sensors 200. The trajectory estimation unit 27 estimates three overlapping trajectory candidates for all combinations of the three sensors 200 as the trajectory R of the mobile object 210. The three overlapping trajectory candidates do not always completely match. In such a case, the trajectory estimation unit 27 may select the closest three trajectory candidates among the plurality of estimated trajectory candidates and estimate the trajectory R. For example, the trajectory estimation unit 27 estimates the trajectory R by selecting one of the three selected trajectory candidates or averaging the three selected trajectory candidates. In the estimated trajectory R, a direction viewed from the sensor 200-*n* and sensor 200-*m* is $\varphi_{Rnm}$. The trajectory estimation unit 27 estimates, for example, the average value and intermediate value, or the like of the velocities estimated for all combinations of the three sensors 200 as the velocity in the trajectory R.

The trajectory R estimated by the trajectory estimation unit 27 is used to estimate the position of the mobile object 210 in a time frame (also referred to as a verification frame) to be verified next. For example, it is assumed that the trajectory R in the current verification frame draws an extended trajectory R' without changing the direction even in the next verification frame. In this case, the position of the representative point in the trajectory R' is estimated as the position of the mobile object 210 in the next verification frame. For example, the position of the representative point is set as the midpoint of the trajectory R'. The velocity of the mobile object 210 estimated in the current verification frame is $v_R$, a half of the length (time length s) of the next verification frame is s/2. In this case, the position of the mobile object 210 in the next verification frame is estimates as the position at a distance of s|$v_R$|/2 in the direction of $\varphi_{R12}$ from the ending end position of the current verification frame. For example, in the verification of the next verification frame, the trajectory estimation unit 27 may select a signal detected by the sensor 200 close to the position of the mobile object 210 estimated in such a method.

For example, the trajectory R of the mobile object 210 estimated by the trajectory estimation unit 27 is displayed on a screen of a display device (not-shown). For example, the trajectory R of the mobile object 210 estimated by the trajectory estimation unit 27 may be output to a system (not-shown) that performs processing based on the estimated trajectory R, or may be accumulated in a database (not-shown).

Figure 13:
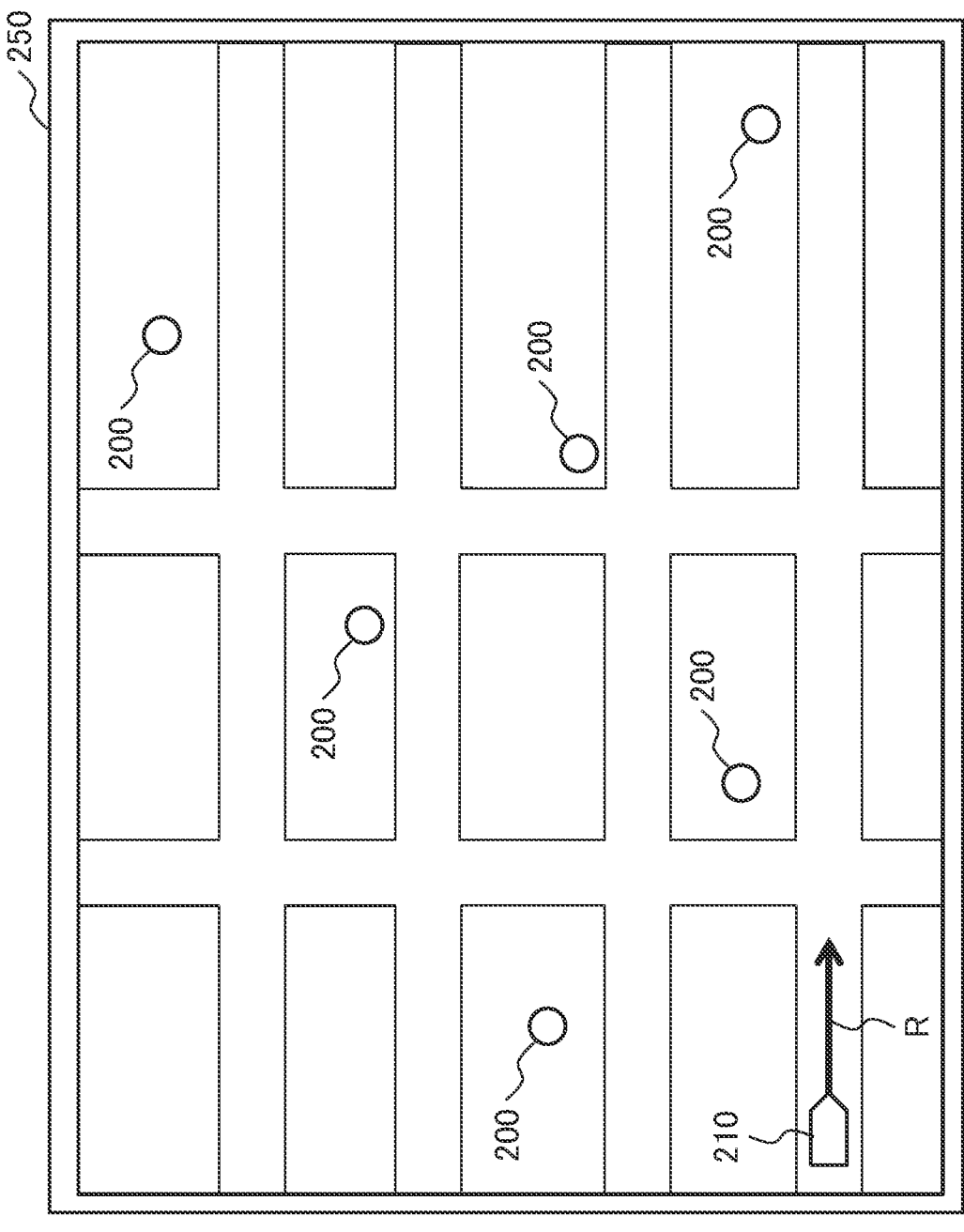
FIG. 13 is a schematic diagram showing an example of displaying a trajectory estimated by the wave motion signal processing device according to the second example embodiment on a screen of a display device.

FIG. 13 is a schematic diagram showing an example in which the trajectory R of the mobile object 210 estimated by the wave motion signal processing device 20 is displayed on the screen of the display device 250. FIG. 13 is an example in which the mobile object 210 such as an automobile or a bicycle moves on a road of a district where the plurality of sensors 200 are arranged. For example, the trajectory R of the mobile object 210 is displayed on a map including a route on which the mobile object 210 moves. For example, the trajectory R of the mobile object 210 is displayed on a map including the route of the mobile object 210 in accordance with the type of the mobile object 210 such as an automobile, a ship, or a submarine. For example, the mobile object 210 is an ambulance that travels while emitting a siren, a ship that travels while sounding a horn, a bicycle that travels while sounding a buzzer, or the like. A motorcycle or an automobile that travels while emitting an exhaust sound at a constant frequency may also be a target of the mobile object 210.

(Operation)

Figure 14:
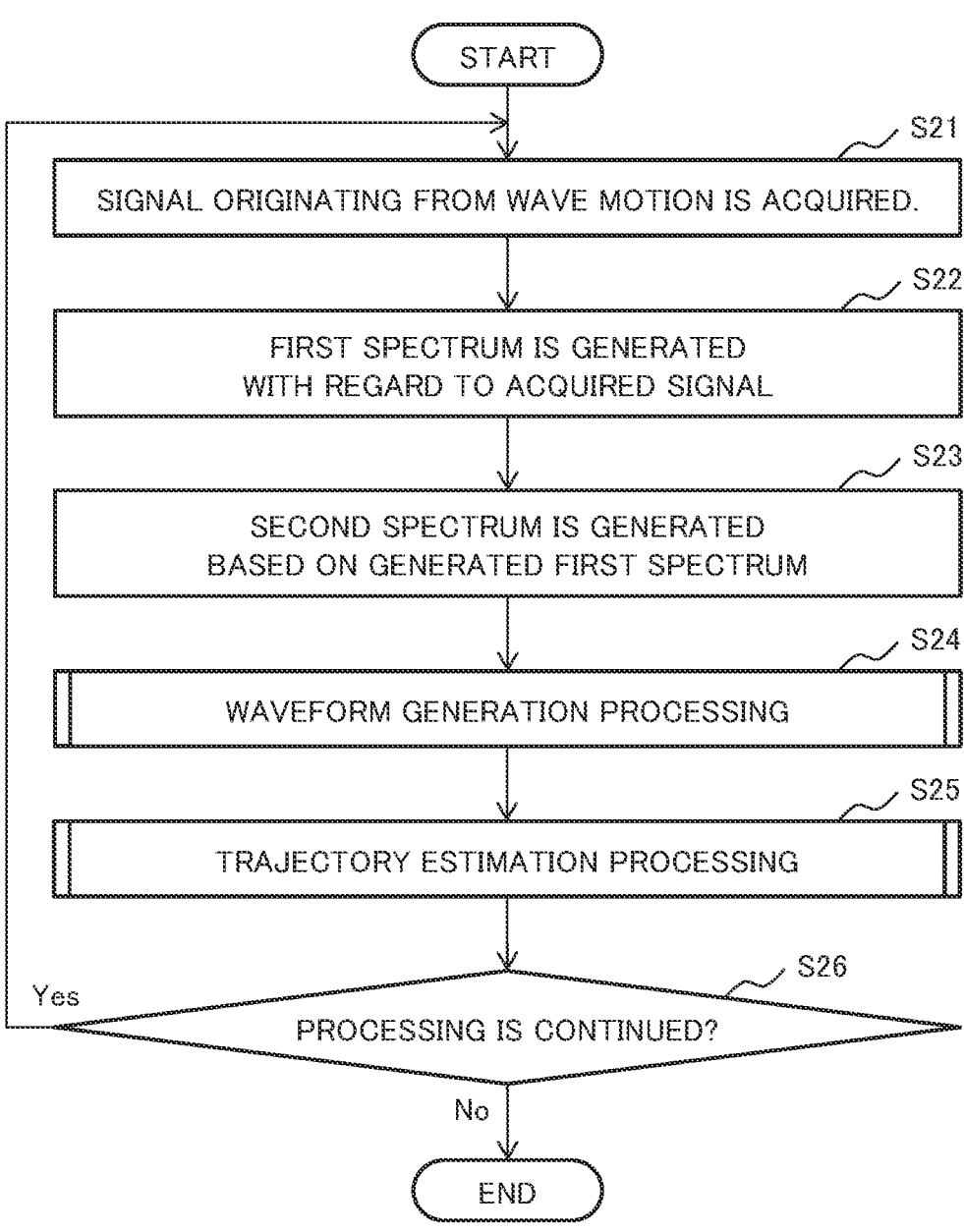
FIG. 14 is a flowchart for illustrating an example of an overview of an operation of the wave motion signal processing device according to the second example embodiment.

Next, the operation of the wave motion signal processing device 20 according to the present example embodiment will be described with reference to the drawings. FIG. 14 is a flowchart for illustrating the of the schematic of the operation of the wave motion signal processing device 20. In the process along the flowchart in FIG. 14 will be described with the wave motion signal processing device 20 as the main body of the operation.

In FIG. 14, first, the wave motion signal processing device 20 acquires a signal originating from the wave motion detected by the plurality of sensors 200 (step S21).

Next, the wave motion signal processing device 20 generates a first spectrum with high resolution for the acquired signal (step S22).

Next, the wave motion signal processing device 20 generates a second spectrum with low resolution based on the generated first spectrum (step S23).

Next, the wave motion signal processing device 20 performs waveform generation processing (step S24). The waveform generation processing in step S24 is similar to the waveform generation processing of the first example embodiment (FIG. 9).

Next, the wave motion signal processing device 20 performs trajectory estimation processing using the peak waveform generated by the waveform generation processing (step S25). Details of the trajectory estimation processing in step S25 will be described below.

If the process is continued after step S25 (Yes in step S26), the process returns to step S21. If the process is not continued after step S25 (No in step S26), the process along the flowchart in FIG. 14 is ended. For example, a scheduled number of times of processes is performed or a scheduled processing time has elapsed, the process is stopped. For example, it may be configured that the process is stopped in accordance with the user's operation.

[Trajectory Estimation Processing]

Next, trajectory estimation processing by the wave motion signal processing device 20 (step S25 in FIG. 14) will be described with reference to the drawings. FIG. 25 is a flowchart for illustrating the trajectory estimation processing. The process along the flowchart in FIG. 15 will be described with the components (trajectory estimation unit 27) of the wave motion signal processing device 20 as the main body of the operation.

Figure 15:
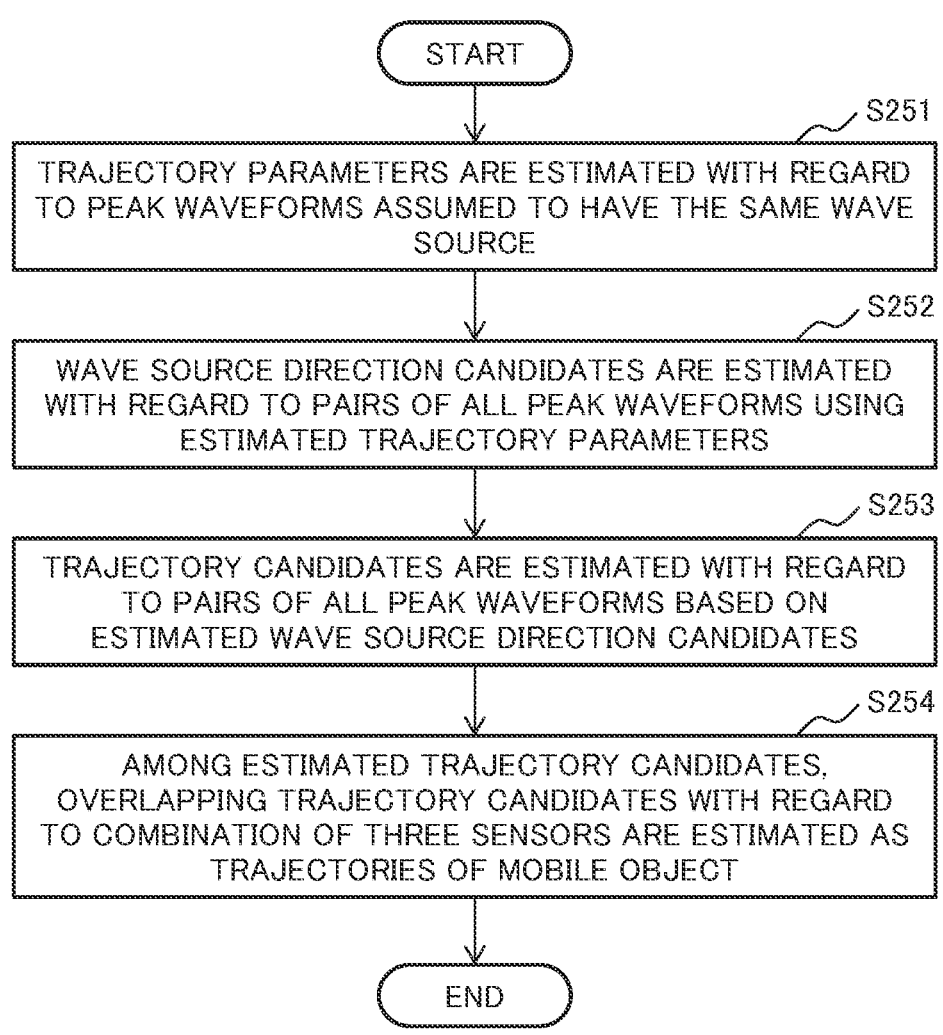
FIG. 15 is a flowchart for illustrating an example of trajectory estimation processing by the wave motion signal processing device according to the second example embodiment.

In FIG. 15, first, the trajectory estimation unit 27 estimates a trajectory parameter by fitting a peak waveform assumed to have the same wave source to a theoretical formula of the Doppler shift (step S251).

Next, the trajectory estimation unit 27 uses the estimated trajectory parameter to estimate the wave source direction candidates with regard to all pairs of the peak waveforms (step S252).

Next, the trajectory estimation unit 27 estimates trajectory candidates with regard to all pairs of the peak waveforms based on the estimated wave source direction candidates (step S253).

Next, the trajectory estimation unit 27 estimates, as a trajectory of the mobile object, overlapping trajectory candidates for a combination of three sensors among the estimated trajectory candidates (step S254). For example, the trajectory of the mobile object estimated by the trajectory estimation unit 27 are displayed on the screen of a display device (not-shown). For example, the trajectory of the mobile object estimated by the trajectory estimation unit 27 may be output to any system (not-shown) that performs processing based on the estimated trajectory, or may be accumulated in a database (not-shown).

As described above, the wave motion signal processing device according to the present example embodiment includes the signal input unit, the first generation unit, the second generation unit, the extraction unit, the tracking unit, the waveform generation unit, and the trajectory estimation unit. The signal input unit receives a signal originating from a wave motion detected by at least one sensor as an input. The first generation unit generates a first spectrum with high resolution based on the input signal. The second generation unit generates a second spectrum with low resolution. The extraction unit extracts, from the second spectrum, a first peak satisfying the extraction condition in the target time frame. The tracking unit tracks, in the first spectrum, the second peak satisfying the extraction condition for the time frame following the target time frame from which the first peak is extracted. The waveform generation unit generates a peak waveform that is time-series data of a frequency including a plurality of second peaks with the first peak as the starting end. The trajectory estimation unit estimates the trajectory of the mobile object having the wave source of the wave motion based on at least one peak waveform.

The present example embodiment, the processing of tracking the peak (second peak) following the starting end (first peak) is performed with high accuracy while alleviating the processing of extracting the starting end (first peak) of the peak waveform. In the present example embodiment, based on the peak waveform configured by the peak (second peak) tracked with high accuracy, the trajectory of the mobile object having the wave source of the wave motion that is the source of the peak waveform is estimated.

According to the present example embodiment, it may be possible to alleviate the processing of estimating the trajectory of the mobile object having the wave source based on the peak waveform without decreasing the accuracy.

In the present example embodiment, an example has been described in which for each of the plurality of selected sensors, a parameter (also referred to as a trajectory parameter) related to the trajectory of the mobile object is estimated by fitting the peak waveform to the theoretical formula f of the Doppler shift. For example, if the positive/negative of an angle formed by a straight line passing between two sensors and the trajectory of the wave source is known, a single trajectory may be estimated by fitting the peak waveform to the theoretical formula f of the Doppler shift for the two sensors.

Third Example Embodiment

Figure 16:
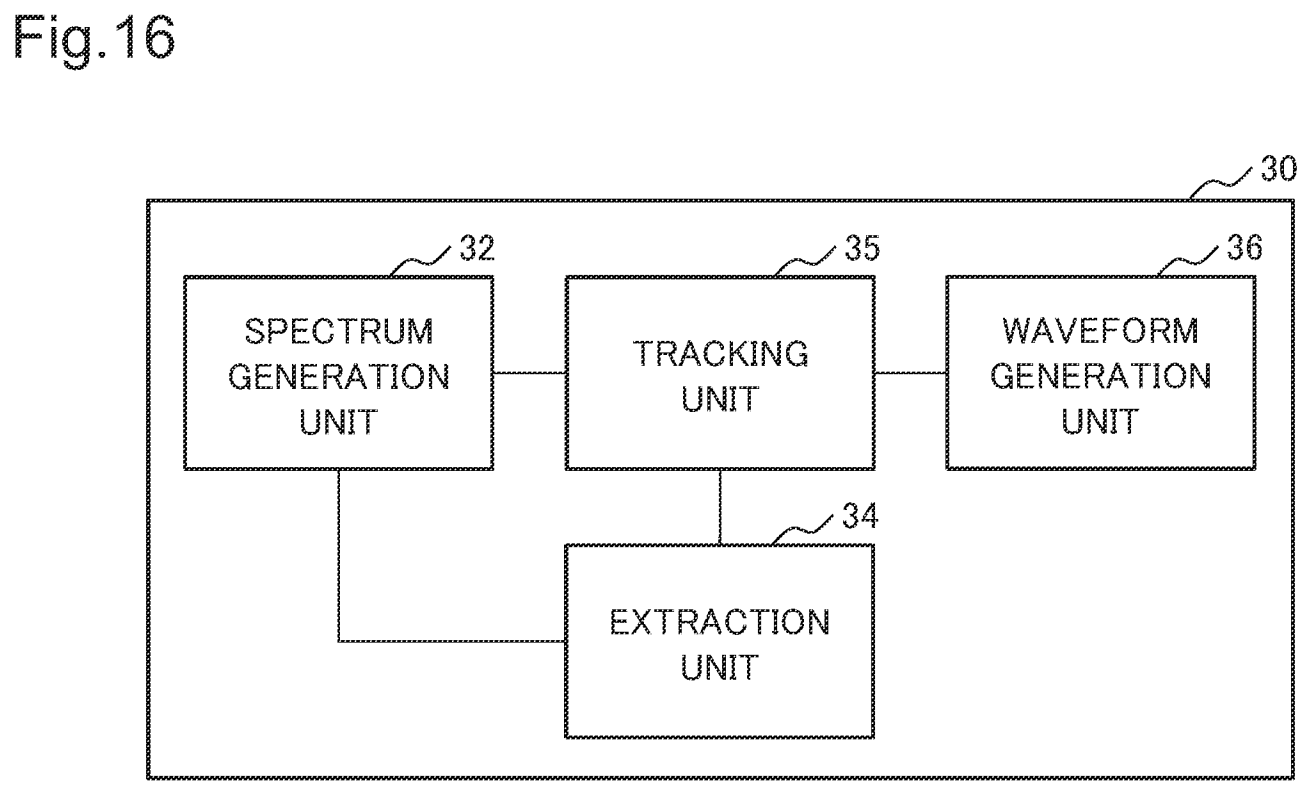

Next, a wave motion signal processing device according to a third example embodiment will be described with reference to the drawings. The wave motion signal processing device according to the present example embodiment has a simplified configuration of the wave motion signal processing devices of the first and second example embodiments. FIG. 16 is a block diagram illustrating an example of a configuration of the wave motion signal processing device 30 according to the present example embodiment. The wave motion signal processing device 30 includes a spectrum generation unit 32, an extraction unit 34, a tracking unit 35, and a waveform generation unit 36.

The spectrum generation unit 32 generates a first spectrum with high resolution and a second spectrum with low resolution based on an input signal originating from a wave motion detected by at least one sensor. The extraction unit 34 extracts, from the second spectrum, a first peak satisfying the extraction condition in the target time frame. The tracking unit 35 tracks, in the first spectrum, the second peak satisfying the extraction condition for the time frame following the target time frame from which the first peak is extracted. The waveform generation unit 36 generates a peak waveform that is time-series data of a frequency including a plurality of second peak with the first peak as the starting end.

In the present example embodiment, the starting end of the peak waveform is extracted in the second spectrum with low resolution, and the peak following the starting end is tracked in the first spectrum with high resolution. Therefore, according to the present example embodiment, it may be possible to alleviate the load on the processing of the signal originating from the wave motion by alleviating the processing of extracting the starting end of the peak waveform.

(Hardware)

Here, a hardware configuration for performing processing by the wave motion signal processing device according to each example embodiment of the present disclosure will be described using the information processing device 90 in FIG. 17 as an example. The information processing device 90 in FIG. 17 is a configuration example for performing processing by the wave motion signal processing device of each example embodiment, and not limiting to the scope of the present disclosure.

Figure 17:
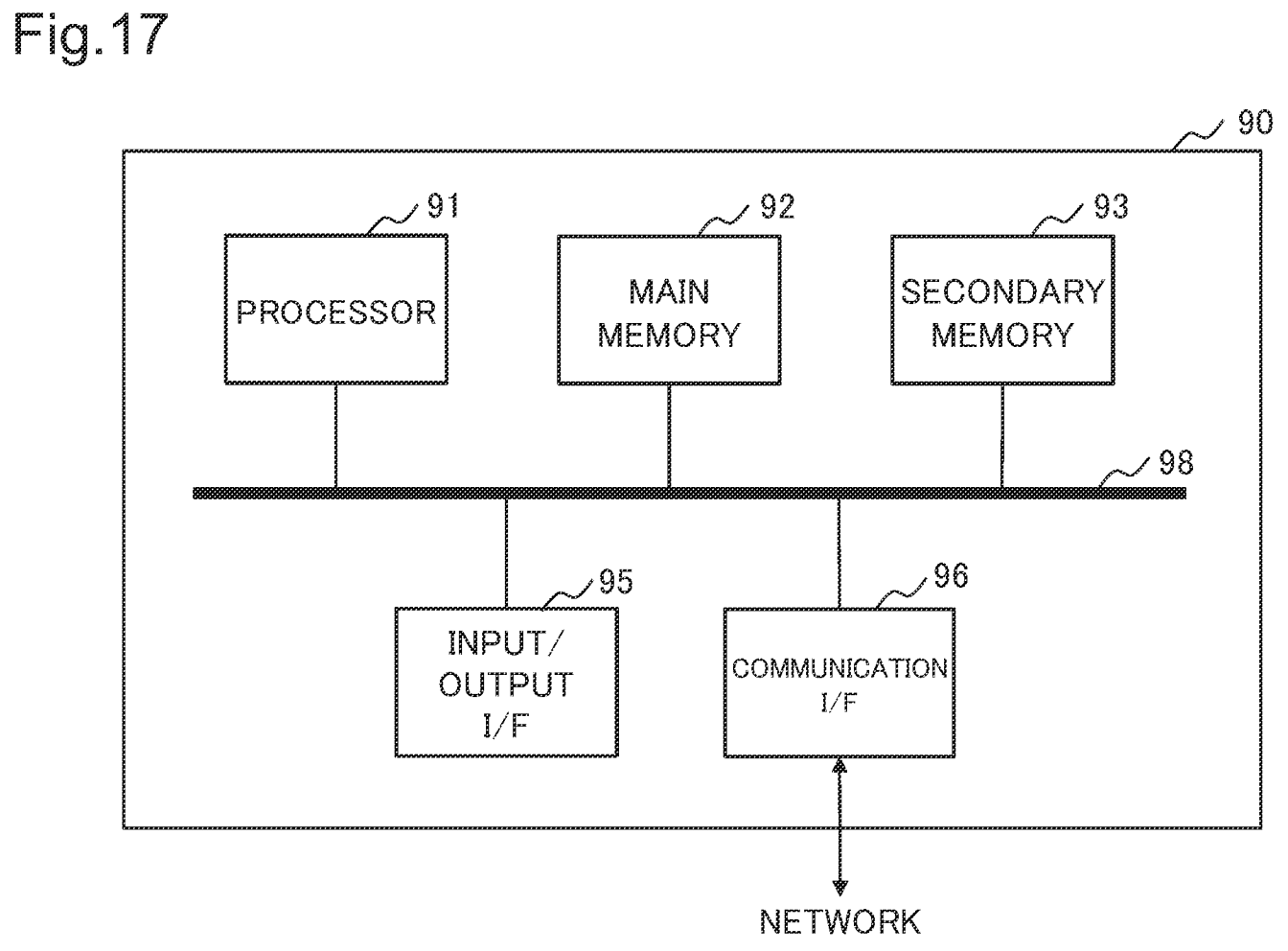

As shown in FIG. 17, the information processing device 90 includes a processor 91, a main memory 92, a secondary memory 93, an input/output interface 95, and a communication interface 96. FIG. 17, the interface is abbreviated as an interface (I/F). The processor 91, the main memory 92, the secondary memory 93, the input/output the interface 95, and the communication interface 96 are data communicably connected to each other via bus 98. The processor 91, the main memory 92, the secondary memory 93, and the input/output interface 95 are connected to a network such as the Internet or an intranet via the communication interface 96.

The processor 91 develops a program stored in the secondary memory 93 or the like in the main memory 92. The processor 91 executes the program developed in the main memory 92. In the present example embodiment, a software program installed in the information processing device 90 may be used. The processor 91 executes processing by the wave motion signal processing device according to the present example embodiment.

The main memory 92 has an area in which a program is developed. A program stored in the secondary memory 93 or the like is developed in the main memory 92 by the processor 91. The main memory 92 is achieved by, for example, a volatile memory such as a dynamic random access memory (DRAM). A non-volatile memory such as a magnetoresistive random access memory (MRAM) may be configured/added as the main memory 92. The secondary memory 93 stores various data such as programs.

The secondary memory 93 is achieved by a local disk such as a hard disk or a flash memory. The various data may be stored in the main memory 92 and the secondary memory 93 may be omitted.

The input/output interface 95 is an interface for connecting the information processing device 90 and a peripheral device based on a standard or a specification. The communication interface 96 is an interface for connecting to an external system or device through a network such as the Internet or an intranet based on a standard and a specification. The input/output interface 95 and communication interface 96 may be shared as an interface connected to an external device.

An input device such as a keyboard, a mouse, and a touch panel may be connected to the information processing device 90 as necessary. These input devices are used to input information and settings. When the touch panel is used as the input device, the display screen of the display device may also serve as the interface of the input device. Data communication between the processor 91 and input device may be mediated by the input/output interface 95.

The information processing device 90 may be provided with a display device for displaying information. When a display device is provided, the information processing device 90 preferably includes a display control device (not-shown) for controlling display of the display device. The display device may be connected to the information processing device 90 via the input/output interface 95.

The information processing device 90 may be provided with a drive device. The drive device mediates reading of data and a program from the recording medium, writing of a processing result of the information processing device 90 to the recording medium, and the like between the processor 91 and the recording medium (program recording medium). The drive device may be connected to the information processing device 90 via the input/output interface 95.

The above is an example of a hardware configuration for enabling the wave motion signal processing device according to each example embodiment of the present invention. The hardware configuration in FIG. 17 is an example of a hardware configuration for performing arithmetic processing of the wave motion signal processing device according to each example embodiment, and not limiting the scope of the present invention. A program for causing a computer to execute processing related to the wave motion signal processing device according to each example embodiment is also included in the scope of the present invention. A program recording medium in which a program according to each example embodiment is recorded is also included in the scope of the present invention. The recording medium may be achieved by, for example, an optical recording medium such as a compact disc (CD) or a digital versatile disc (DVD). The recording medium may also be achieved by a semiconductor recording medium such as a universal serial bus (USB) memory or a secure digital (SD) card. The recording medium may be achieved by a magnetic recording medium such as a flexible disk, or another recording medium. When a program executed by the processor is recorded in a recording medium, the recording medium corresponds to a program recording medium.

The components of the wave motion signal processing device of each example embodiment may be combined in any manner. The components of the wave motion signal processing device of each example embodiment may be achieved by software or a circuit.

While the invention has been particularly shown and described with reference to exemplary embodiments thereof, the invention is not limited to these embodiments It will be understood by those of ordinary skill in the art that various changes in form and details may be made therein without departing from the spirit and scope of the present invention as defined by the claims.

REFERENCE SIGNS LIST

10, 20, 30 Wave Motion Signal Processing Device
11, 21 Signal Input Unit
12, 22 First Generation Unit
13, 23 Second Generation Unit
14, 24, 34 Extraction Unit
15, 25, 35 Tracking Unit
16, 26, 36 Waveform Generation Unit
27 Trajectory Estimation Unit
32 Spectrum Generation Unit
100, 200 Sensor
120, 220 Spectrum Generation Unit

What is claimed is:

1. A wave motion signal processing device comprising:
a memory storing instructions; and
a processor connected to the at least one memory and configured to execute the instructions to:
generate a first spectrum with high resolution and a second spectrum with low resolution based on an input signal derived from a wave motion detected by at least one sensor;
extract, from the second spectrum, a first peak satisfying an extraction condition in a target time frame;
track, in the first spectrum, a second peak satisfying the extraction condition with regard to a time frame following the target time frame from which the first peak is extracted; and
generate a peak waveform, which is time-series data of a frequency including a plurality of second peaks, using the first peak as a starting end.

2. The wave motion signal processing device according to claim 1, wherein
the processor is configured to execute the instructions to
convert, for each time frame, the input signal in a time domain into a frequency spectrum that is a signal in a frequency domain,
arrange the frequency spectrum in time series to generate the first spectrum, calculate a representative value of an amplitude of a
frequency for each bin obtained by cutting out the first
spectrum at a unit frequency for each unit time using
the first spectrum, and generate the second spectrum based on the computed
representative value, and track a plurality of the second peaks following the first
peak by sequentially extracting, in the first spectrum,
the second peaks satisfying the extraction condition for
a plurality of the time frames following the target time
frame.

3. The wave motion signal processing device according to
claim 2, wherein the processor is configured to execute the instructions to calculate, with regard to the first peak extracted from a bin
of the target time frame, a peak frequency at which an
amplitude inside the bin is maximum and a frequency
change amount, estimate, based on the peak frequency and the frequency
change amount, a frequency prediction value of a peak
following the first peak, detects, within a tracking range
in accordance with the estimated frequency prediction
value, the second peak satisfying the extraction condi-
tion from the time frame following the target time
frame, and track, with regard to a time frame following the time
frame in which the second peak is detected, a second
peak following the first peak by sequentially detecting
the second peak following the second peak.

4. The wave motion signal processing device according to
claim 1, wherein the processor is configured to execute the instructions to convert, for each time frame, the input signal in a time
domain into a frequency spectrum that is a signal in a
frequency domain, thin out frequency components of the frequency spec-
trum, arrange the frequency spectrum from which frequency
components are thinned out in time series to generate
the second spectrum, and locally generate the first spectrum by increasing resolu-
tion around where the first peak and second peak are
extracted, and track a plurality of the second peaks following the first
peak by sequentially extracting the second peaks sat-
isfying the extraction condition in the locally generated
first spectrum for a plurality of the time frames follow-
ing the target time frame.

5. The wave motion signal processing device according to
claim 1, wherein the processor is configured to execute the instructions to determine, when a predetermined time has elapsed since
the second peak is last detected, that the second peak
detected last is a third peak at an ending end, and generate the peak waveform that has the first peak as a
starting end, passes through a plurality of the second
peaks, and has the third peak as an ending end.

6. The wave motion signal processing device according to
claim 1, wherein the processor is configured to execute the instructions to calculate at least one of a representative value and a
variance with regard to an amplitude of a frame
included in a bin of the target time frame, and the extraction condition includes at least one condition of a first extraction condition that the representative value is
equal to or more than a first threshold, a second extraction condition that the representative value
divided by a noise level is equal to or more than a
second threshold, a third extraction condition that a sharpness of the repre-
sentative value is equal to or more than a third thresh-
old, a fourth extraction condition that the variance is equal to
or less than a fourth threshold, and a fifth extraction condition that the representative value
has a maximum value.

7. The wave motion signal processing device according to
claim 1, wherein the processor is configured to execute the instructions to leave one peak waveform and deletes the other peak
waveforms with regard to the overlapping peak wave-
forms, and delete the peak waveform with regard to the peak wave-
form that has a time length less than a predetermined
length.

8. The wave motion signal processing device according to
claim 1, further comprising wherein the processor is configured to execute the instructions to estimate a trajectory of a mobile object having a wave
source of the wave motion based on at least one of the
peak waveforms.

9. A wave motion signal processing method executed by
a computer, the method comprising:

generating a first spectrum with high resolution and a
second spectrum with low resolution based on an input
signal originating from a wave motion detected by at
least one sensor;

extracting, from the second spectrum, a first peak satis-
fying an extraction condition in a target time frame;

tracking, in the first spectrum, a second peak satisfying
the extraction condition with regard to a time frame
following the target time frame from which the first
peak was extracted; and generating a peak waveform, which is time-series data of
a frequency including a plurality of second peaks,
having the first peak as a starting end.

10. A non-transitionary recording medium having a pro-
gram recorded therein that causes a computer to execute:

a process of generating a first spectrum with high reso-
lution and a second spectrum with low resolution based
on an input signal originating from a wave motion
detected by at least one sensor;

a process of extracting, from the second spectrum, a first
peak satisfying an extraction condition in a target time
frame;

a process of tracking, in the first spectrum, a second peak
satisfying the extraction condition with regard to a time
frame following the target time frame from which the
first peak was extracted; and a process of generating a peak waveform, which is
time-series data of a frequency including a plurality of
second peaks, having the first peak as a starting end.

* * * * *